US011373018B2

(12) United States Patent
Kimura

(10) Patent No.: US 11,373,018 B2
(45) Date of Patent: Jun. 28, 2022

(54) METHOD OF DISPLAYING MODEL AND DESIGNING PATTERN, AND STORAGE MEDIUM

(71) Applicant: Kioxia Corporation, Tokyo (JP)

(72) Inventor: Taiki Kimura, Kawasaki Kanagawa (JP)

(73) Assignee: KIOXIA CORPORATION, Tokyo (JP)

(*) Notice: Subject to any disclaimer, the term of this patent is extended or adjusted under 35 U.S.C. 154(b) by 351 days.

(21) Appl. No.: 16/123,387

(22) Filed: Sep. 6, 2018

(65) Prior Publication Data

US 2019/0228119 A1 Jul. 25, 2019

(30) Foreign Application Priority Data

Jan. 25, 2018 (JP) ............................ JP 2018-010465
Jul. 11, 2018 (JP) ............................ JP 2018-131509

(51) Int. Cl.

| | |
|---|---|
| ***G06F 30/20*** | (2020.01) |
| ***G06F 17/16*** | (2006.01) |
| ***G03F 7/20*** | (2006.01) |
| ***G06F 3/147*** | (2006.01) |
| ***G06F 17/12*** | (2006.01) |
| ***G06F 111/10*** | (2020.01) |

(52) U.S. Cl.

CPC .............. *G06F 30/20* (2020.01); *G03F 7/705* (2013.01); *G06F 17/16* (2013.01); *G06F 3/147* (2013.01); *G06F 17/12* (2013.01); *G06F 2111/10* (2020.01)

(58) Field of Classification Search

CPC ...... G06F 30/20; G06F 17/16; G06F 2111/10; G06F 3/147; G06F 17/12; G06F 30/25; G06F 30/27; G06F 30/28; G03F 7/705

See application file for complete search history.

(56) References Cited

U.S. PATENT DOCUMENTS 7,739,650 B2 6/2010 Torres et al.
7,849,423 B1 * 12/2010 Yenikaya .................. G03F 1/36 716/55
8,447,095 B2 5/2013 Cao et al.

(Continued)

FOREIGN PATENT DOCUMENTS

JP 2011128137 A 6/2011
JP 5398484 B2 1/2014

OTHER PUBLICATIONS

Fuhner et al., "Artificial Evolution for the Optimization of Lithographic Process Conditions", 2013.*

(Continued)

*Primary Examiner* — Kamini S Shah
*Assistant Examiner* — Peter Pham
(74) *Attorney, Agent, or Firm* — Holtz, Holtz & Volek PC

(57) ABSTRACT

According to one embodiment, a method of displaying model includes: sampling a pattern to acquire an attention point; calculating a spatial or planar distribution that indicates any one of a design density, a lithography target density, a mask transmittance, or an optical image intensity at N points (N being an integer equal to or greater than 1) on the pattern including the attention point; calculating a threshold for the pattern; estimating, based on the distribution and the threshold, N elements respectively corresponding to the N points as a model; and displaying the estimated model.

6 Claims, 30 Drawing Sheets

Start resist model estimation and display processing

ST10B$_2$ Storage unit stores test mask pattern, test resist pattern, and test wiring pattern ST11 Optical image intensity distribution calculation unit acquires a plurality of attention points by sampling ST13B$_2$ Design density distribution trimming unit calculates design density distribution around attention point based on test wiring pattern ST12 Optical image intensity distribution calculation unit calculates first optical image intensity distribution around attention point based on test mask pattern ST14B$_2$ Design density distribution trimming unit trims design density distribution within range of diameter D of integral kernel K ST15 Development threshold calculation unit calculates development threshold ST16B$_2$ Integral kernel estimation unit generates resist image vector b and design density distribution matrix A'''

ST17B$_2$ Integral kernel estimation unit estimates integral kernel vector x''' by solving linear equation A'''x''' = b ST18 Display unit displays resist model End resist model estimation and display processing

(56) References Cited

U.S. PATENT DOCUMENTS

| | | | | |
|---|---|---|---|---|
| 8,731,882 | B2 | 5/2014 | Van Beurden | |
| 9,588,438 | B2 * | 3/2017 | Hsu | G03F 7/70441 |
| 2007/0101310 | A1 * | 5/2007 | Stirniman | G03F 7/70441 430/5 |
| 2007/0134940 | A1 * | 6/2007 | Hirukawa | G03F 1/36 438/780 |
| 2009/0074287 | A1 * | 3/2009 | Kawashima | G03F 1/36 430/5 |
| 2011/0222739 | A1 * | 9/2011 | Zhou | G03F 7/70516 382/112 |
| 2014/0317580 | A1 * | 10/2014 | Ye | G06F 30/20 716/53 |
| 2016/0077426 | A1 | 3/2016 | Jang et al. | |
| 2017/0147733 | A1 * | 5/2017 | Rosenbluth | G03F 1/36 |
| 2018/0107120 | A1 * | 4/2018 | Swaenen | G03F 7/20 |
| 2018/0341173 | A1 * | 11/2018 | Li | G03F 1/36 |
| 2018/0364591 | A1 * | 12/2018 | Socha | G03F 7/706 |

OTHER PUBLICATIONS

Fuhner et al., "Artificial Evolution for the Optimization of Lithographic Process Conditions" (Year: 2013).*

Pan et al. "Design for manufacturing meets advanced process control: A survey" (Year: 2008).*

* cited by examiner

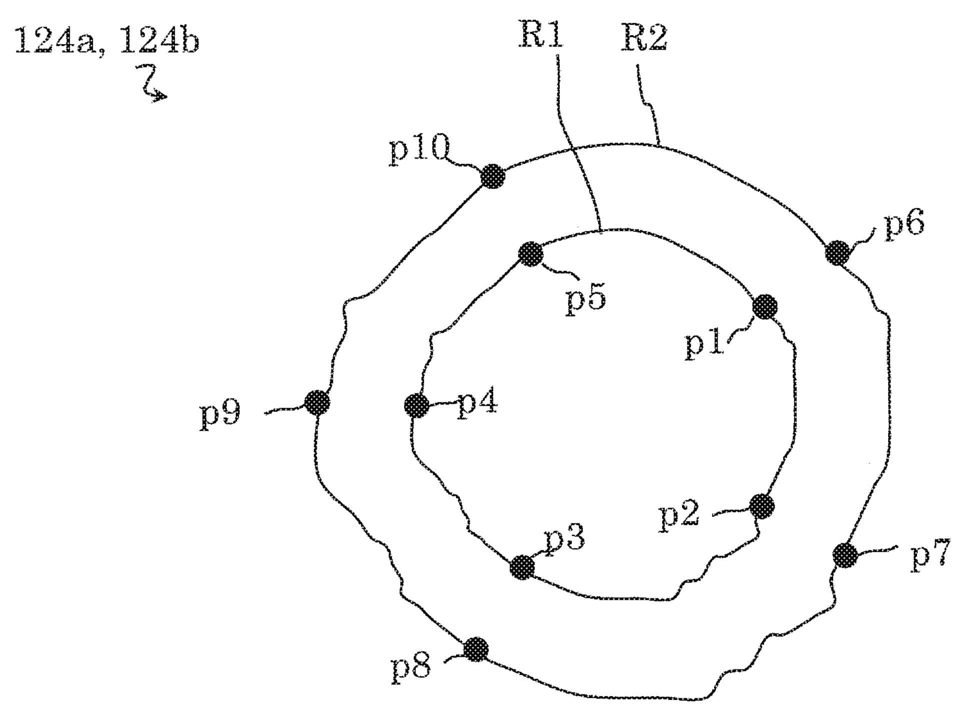
F I G. 12

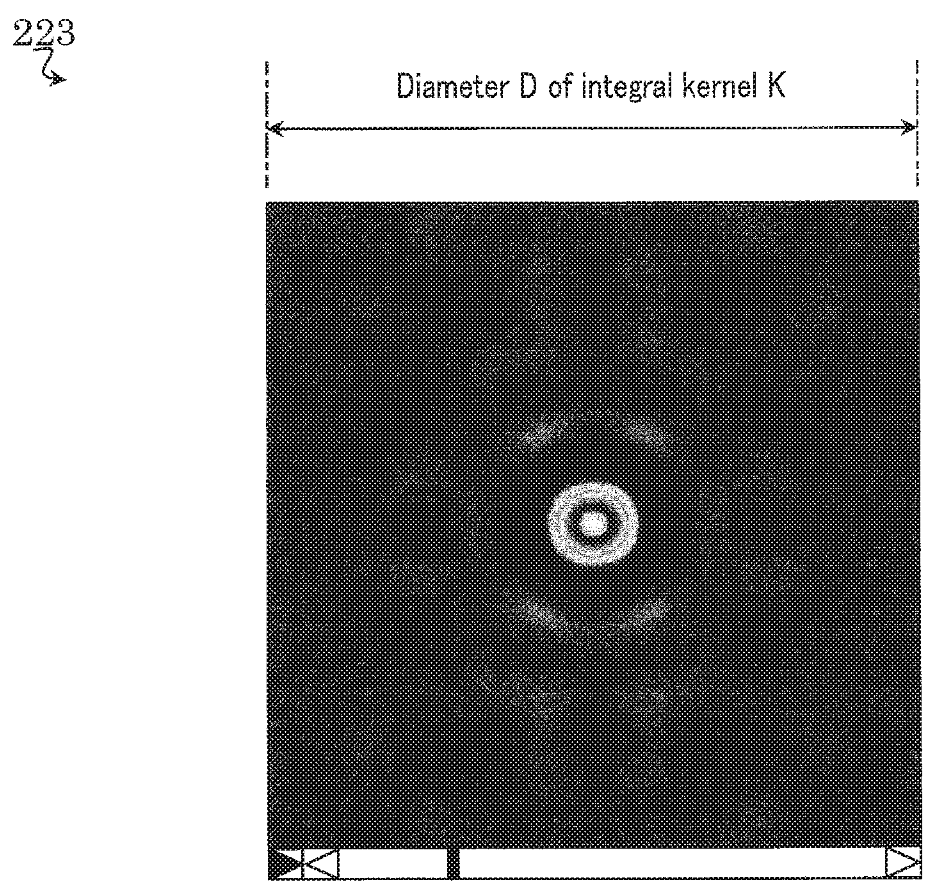
F I G. 15

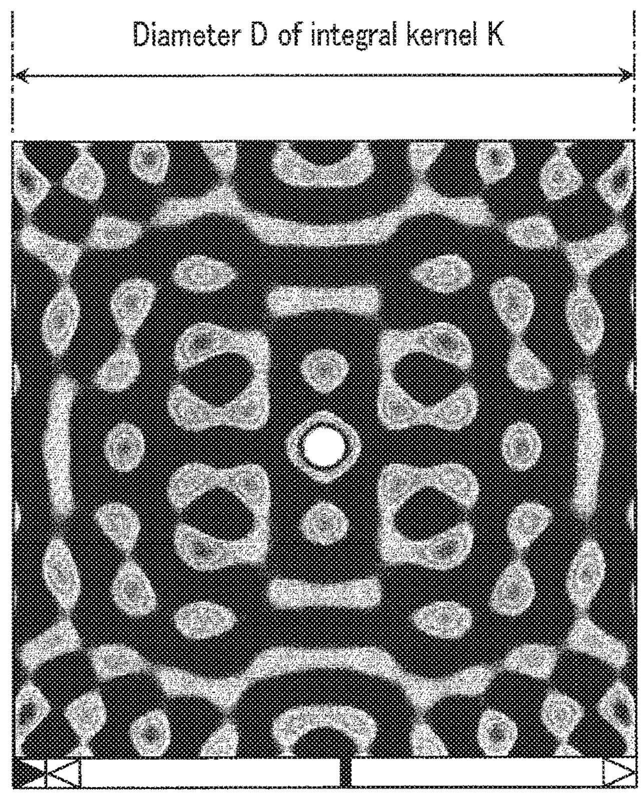
F I G. 17
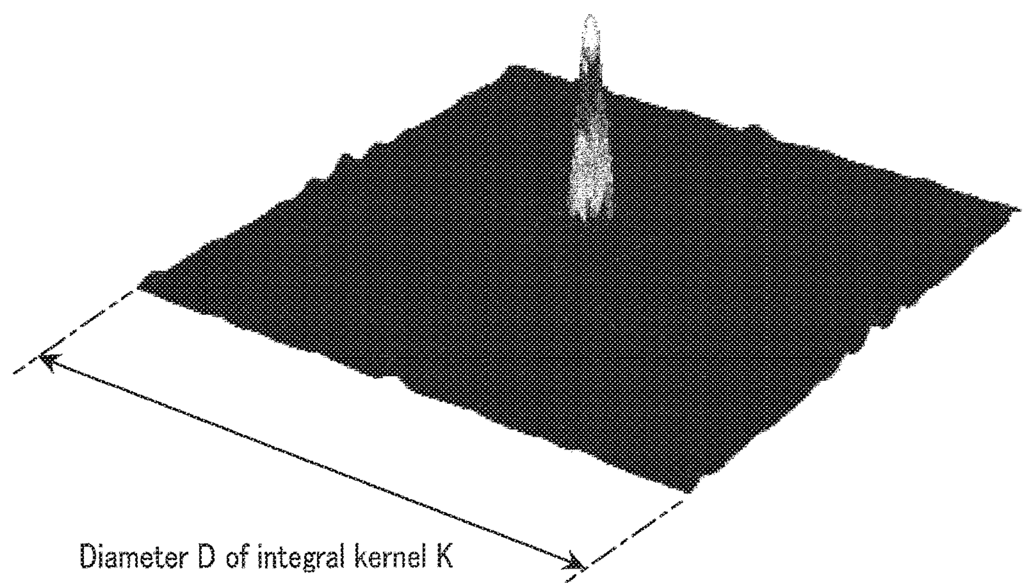
F I G. 18

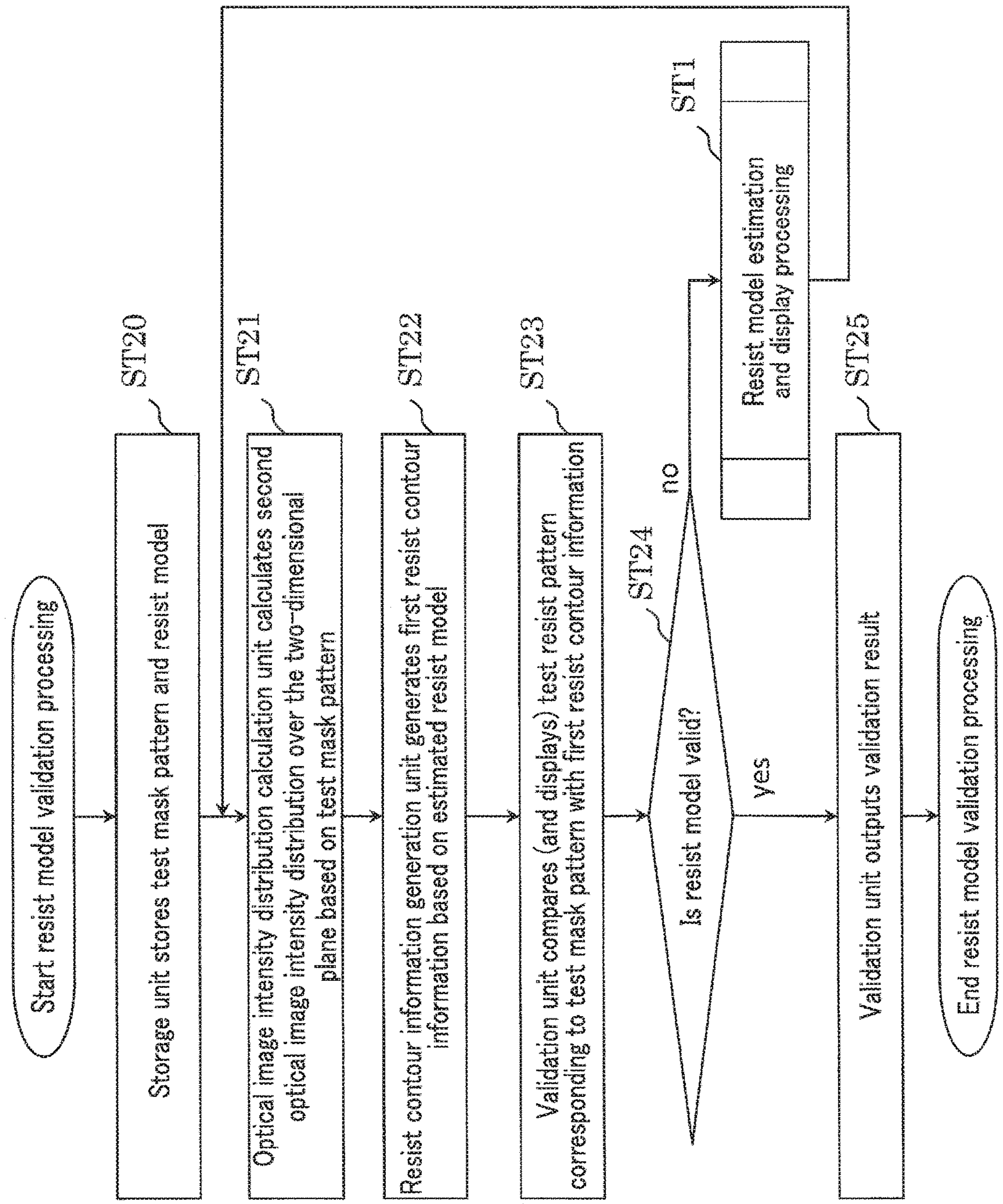
F I G. 20

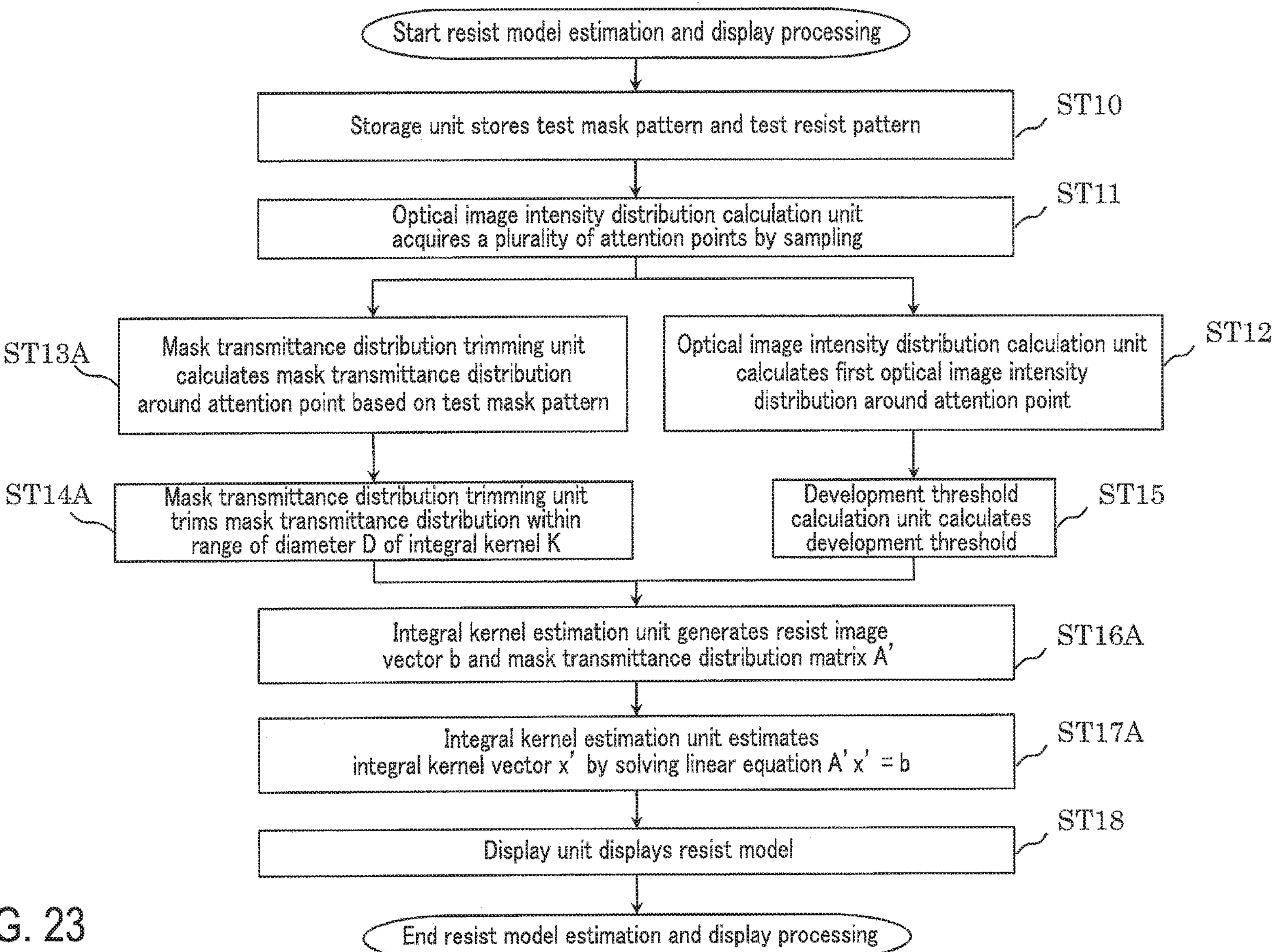
F I G. 23

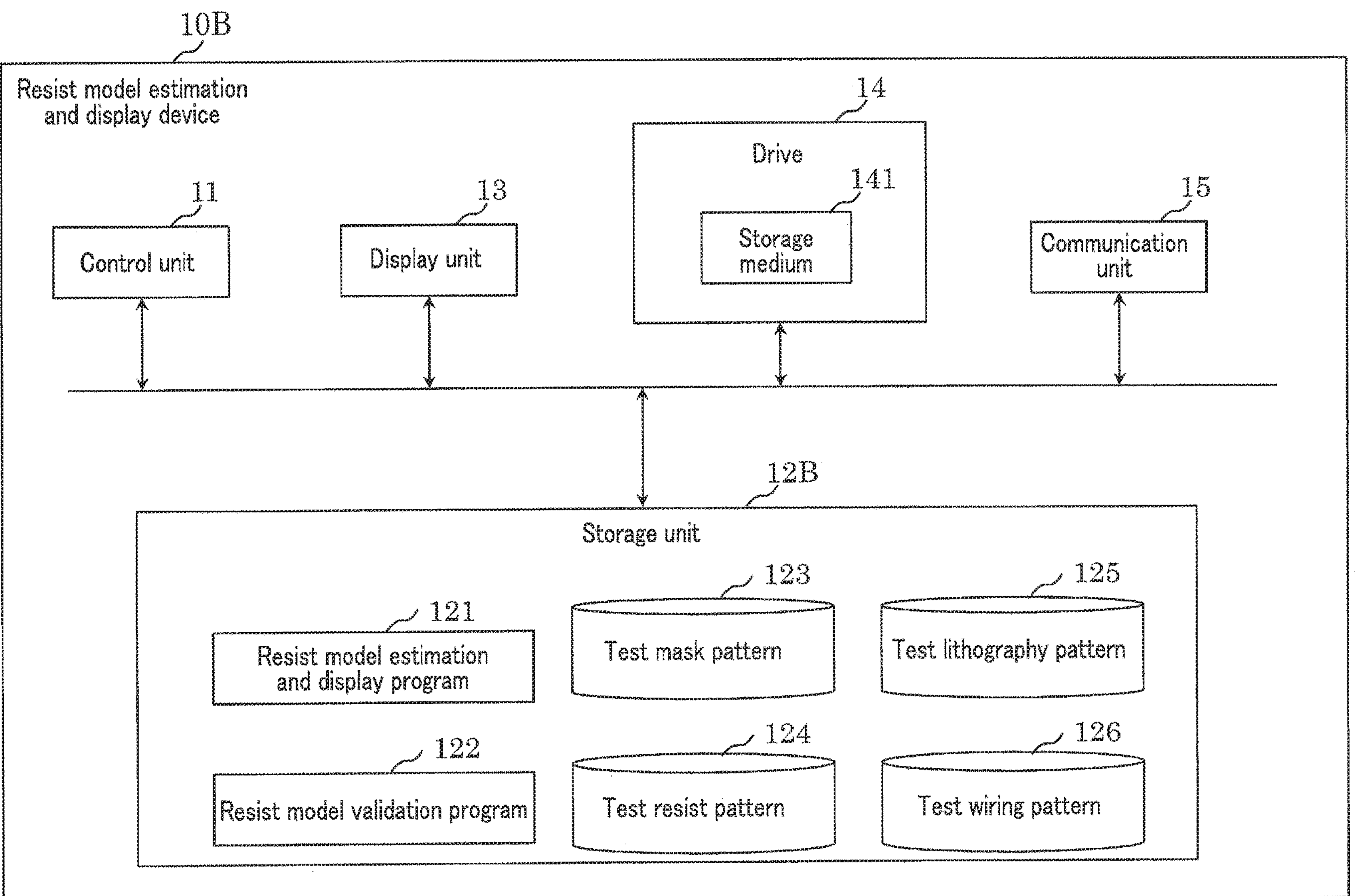
F I G. 25

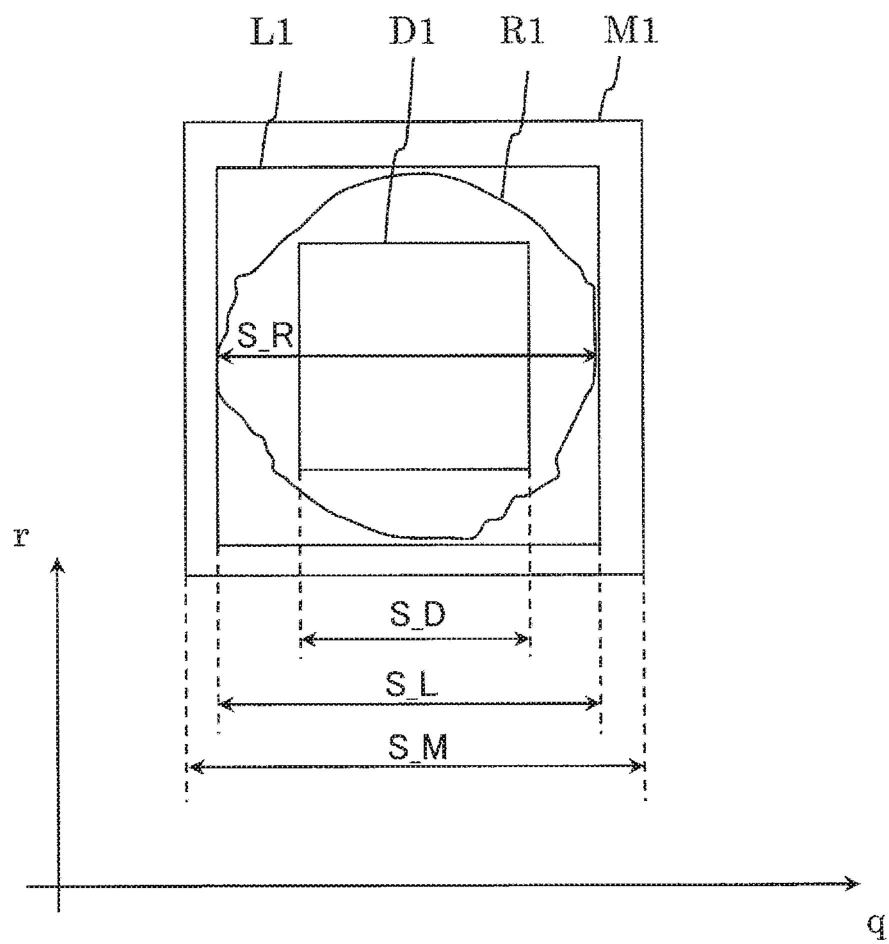
F I G. 26

METHOD OF DISPLAYING MODEL AND DESIGNING PATTERN, AND STORAGE MEDIUM

CROSS-REFERENCE TO RELATED APPLICATIONS

This application is based upon and claims the benefit of priority from Japanese Patent Application No. 2018-010465, filed Jan. 25, 2018; and No. 2018-131509, filed Jul. 11, 2018 the entire contents all of which are incorporated herein by reference.

FIELD

Embodiments described herein relate generally to a method of displaying model, a method of designing pattern, and a storage medium.

BACKGROUND

A resist model is known as a means for estimating a resist pattern which is generated based on a mask pattern.

BRIEF DESCRIPTION OF THE DRAWINGS

FIG. 12 is a schematic view for explaining a sampling operation which acquires attention points in the resist model estimation and display operation according to the first embodiment.

FIG. 15 is a schematic view for explaining the resist model visualized in the resist model estimation and display operation according to the first embodiment.

FIG. 17 is a schematic view for explaining the resist model visualized in the resist model estimation and display operation according to the first embodiment.

FIG. 18 is a diagram for explaining the resist model visualized in the resist model estimation and display operation according to the first embodiment.

FIG. 20 is a flowchart for explaining a resist model validation operation in the resist model estimation and display device according to the first embodiment.

FIG. 23 is a flowchart for explaining a resist model estimation and display operation in the resist model estimation and display device according to the second embodiment.

FIG. 25 is a block diagram for explaining a configuration of a resist model estimation and display device according to modifications of the second embodiment.

FIG. 26 is a schematic view for explaining multiple types of patterns according to the modifications of the second embodiment.

DETAILED DESCRIPTION

Figure 1:
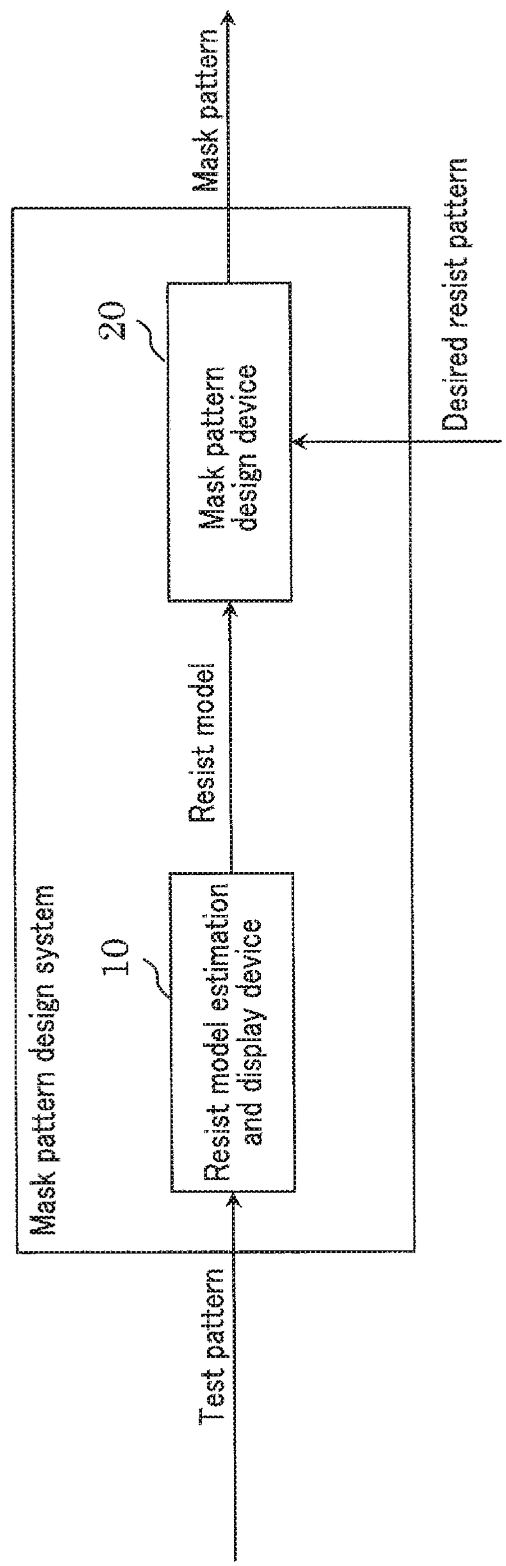
FIG. 1 is a block diagram for explaining a configuration of a mask pattern design system according to a first embodiment.

In general, according to one embodiment, a method of displaying model includes: sampling a pattern to acquire an attention point; calculating a spatial or planar distribution that indicates any one of a design density, a lithography target density, a mask transmittance, or an optical image intensity at N points (N being an integer equal to or greater than 1) on the pattern including the attention point; calculating a threshold for the pattern; estimating, based on the distribution and the threshold, N elements respectively corresponding to the N points as a model; and displaying the estimated model.

Embodiments will be described below with reference to the accompanying drawings. Note that in the following description, common reference numerals denote components having the same functions and configurations.

1. First Embodiment

Here, a mask pattern design system according to a first embodiment will be described. The mask pattern design system according to the first embodiment is applied to, for example, a lithography technique for transferring a desired resist pattern to a semiconductor substrate by using a designed mask pattern. A semiconductor device, for example, is manufactured by using the lithography technique to which the mask pattern design system according to the first embodiment is applied. The semiconductor device includes, for example, a semiconductor storage device.

1.1 Hardware Configuration First, a hardware configuration of the mask pattern design system according to the first embodiment will be described.

1.1.1 Overall Configuration of Mask Pattern Design System

An overall configuration of the mask pattern design system according to the first embodiment will be described with reference to FIG. 1. FIG. 1 is a block diagram showing an example of the overall configuration of the mask pattern design system according to the first embodiment.

A mask pattern design system 1 designs, for example, a mask pattern with an optimum shape for transferring a desired resist pattern to a semiconductor substrate. The designed mask pattern is applied to an external lithography device (not shown).

As shown in FIG. 1, the mask pattern design system 1 includes a resist model estimation and display device 10 and a mask pattern design device 20.

The resist model estimation and display device 10 externally receives a test pattern as input, estimates (generates) a resist model that matches the test pattern, and displays the resist model in a manner that said resist model is visually recognizable to a user. The test pattern includes a pair of a test mask pattern and a test resist pattern which corresponds to the test mask pattern. Specifically, the test resist pattern is a resist pattern acquired as a result of actual transfer to the semiconductor substrate by using the test mask pattern. The resist model estimation and display device 10 outputs the resist model to the mask pattern design device 20.

The mask pattern design device 20 receives the desired resist pattern as input. The mask pattern design device 20 designs a mask pattern that may generate the desired resist pattern based on the resist model received from the resist model estimation and display device 10. The mask pattern design device 20 outputs the designed mask pattern to the external lithography device.

1.1.2 Hardware Configuration of Resist Model Estimation and Display Device

Figure 2:
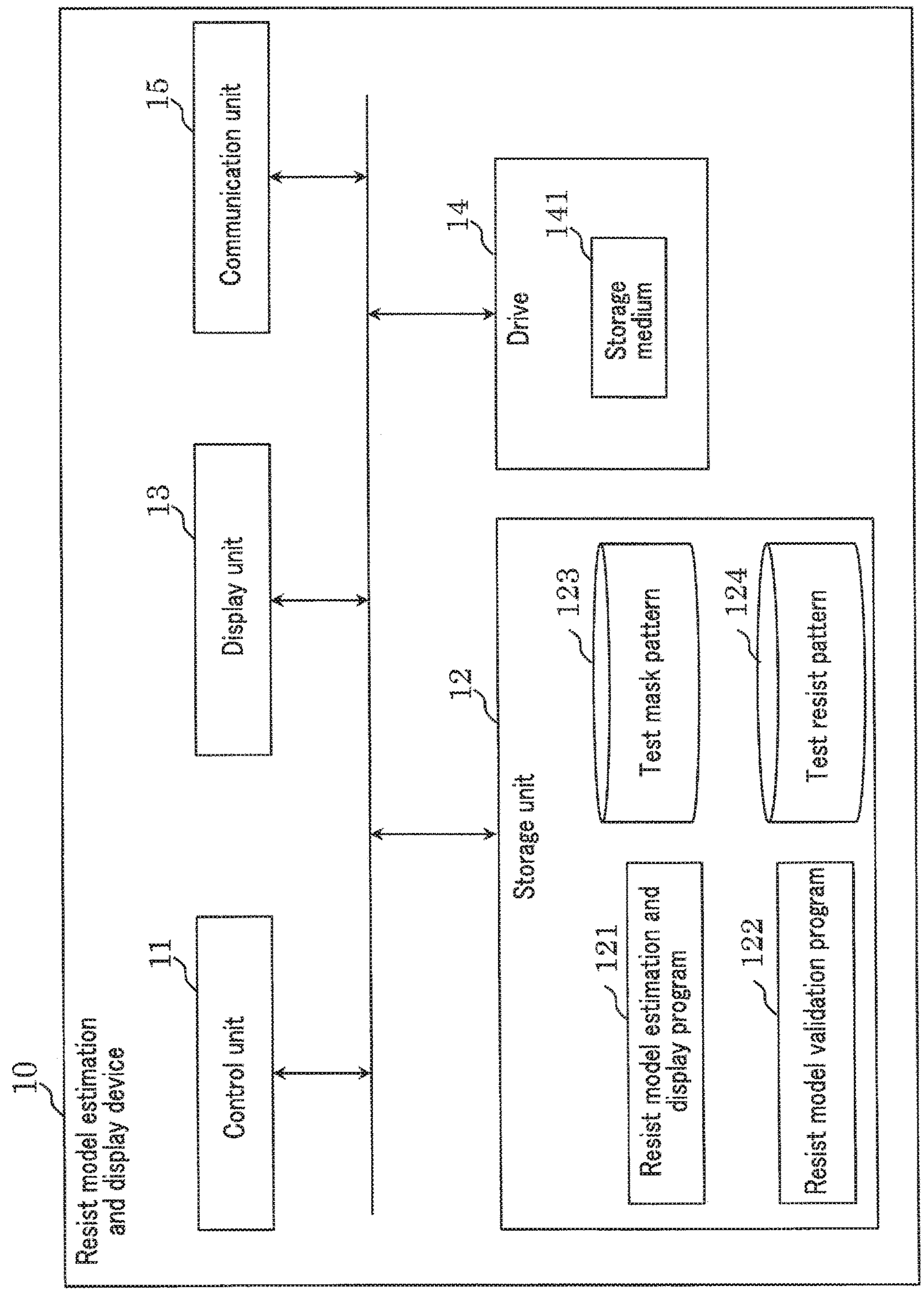
FIG. 2 is a block diagram for explaining a configuration of a resist model estimation and display device according to the first embodiment.

Next, a hardware configuration of the resist model estimation and display device according to the first embodiment will be described with reference to FIG. 2. FIG. 2 is a block diagram for explaining the hardware configuration of the resist model estimation and display device according to the first embodiment. As shown in FIG. 2, the resist model estimation and display device 10 includes a control unit 11, a storage unit 12, a display unit 13, a drive 14, and a communication unit 15.

The control unit 11 includes, for example, a CPU (central processing unit), a RAM (random access memory), and a ROM (read only memory), and controls an operation of the entire resist model estimation and display device 10.

The storage unit 12 is an auxiliary storage device, such as a HDD (hard disk drive) and a SSD (solid state drive). The storage unit 12 stores a resist model estimation and display program 121 and a resist model validation program 122 that are executed in the resist model estimation and display device 10. Furthermore, the storage unit 12 stores, for example, a test mask pattern 123 and a test resist pattern 124 as input information necessary for executing the resist model estimation and display program 121 and the resist model validation program 122.

The resist model estimation and display program 121 is a program for causing the resist model estimation and display device 10 to execute resist model estimation and display processing. This resist model estimation and display processing is processing to estimate the resist model applied to the designing of the mask pattern, and to display the resist model in a manner that said resist model is visually recognizable to a user.

The resist model validation program 122 is a program for causing the resist model estimation and display device 10 to execute resist model validation processing. In this resist model validation processing, the validity of the resist model displayed with the resist model estimation and display program 121 is evaluated to validate applicability of the resist model to the designing of the mask pattern. Details of the resist model estimation and display processing and the resist model validation processing will be described later.

The display unit 13 includes, for example, a display screen, such as an LCD (liquid crystal display) or EL (electroluminescence) display, and a CRT (cathode ray tube). The display unit 13 outputs and displays to the user the result of executing the resist model estimation and display program 121 and the resist model validation program 122 executed by the control unit 11.

The drive 14 may be, for example, a CD (compact disk) drive or a DVD (digital versatile disk) drive, and is a device for reading a program stored in the storage medium 141. The type of the drive 14 may be selected in accordance with the type of the storage medium 141 as appropriate. The aforementioned resist model estimation and display program 121 and resist model validation program 122 may be stored in the storage medium 141.

The storage medium 141 accumulates information of the stored programs, etc. by an electric, magnetic, optical, mechanical, or chemical effect in such a manner that the information is readable by a device such as a computer and other machines. The resist model estimation and display device 10 may acquire the resist model estimation and display program 121 and the resist model validation program 122 from the storage medium 141.

The communication unit 15 is a communication interface responsible for communication of the resist model estimation and display device 10 with the mask pattern design device 20 and the outside of the mask pattern design system 1. The communication unit 15 may adopt any communication scheme, wired or wireless. The communication unit 15 externally receives, for example, the test mask pattern 123 and the test resist pattern 124, and stores the test mask pattern 123 and the test resist pattern 124 in the storage unit 12. The communication unit 15 outputs, to the mask pattern design device 20, the resist model generated as the result of executing the resist model estimation and display program 121 and the resist model validation program 122.

Figure 3:
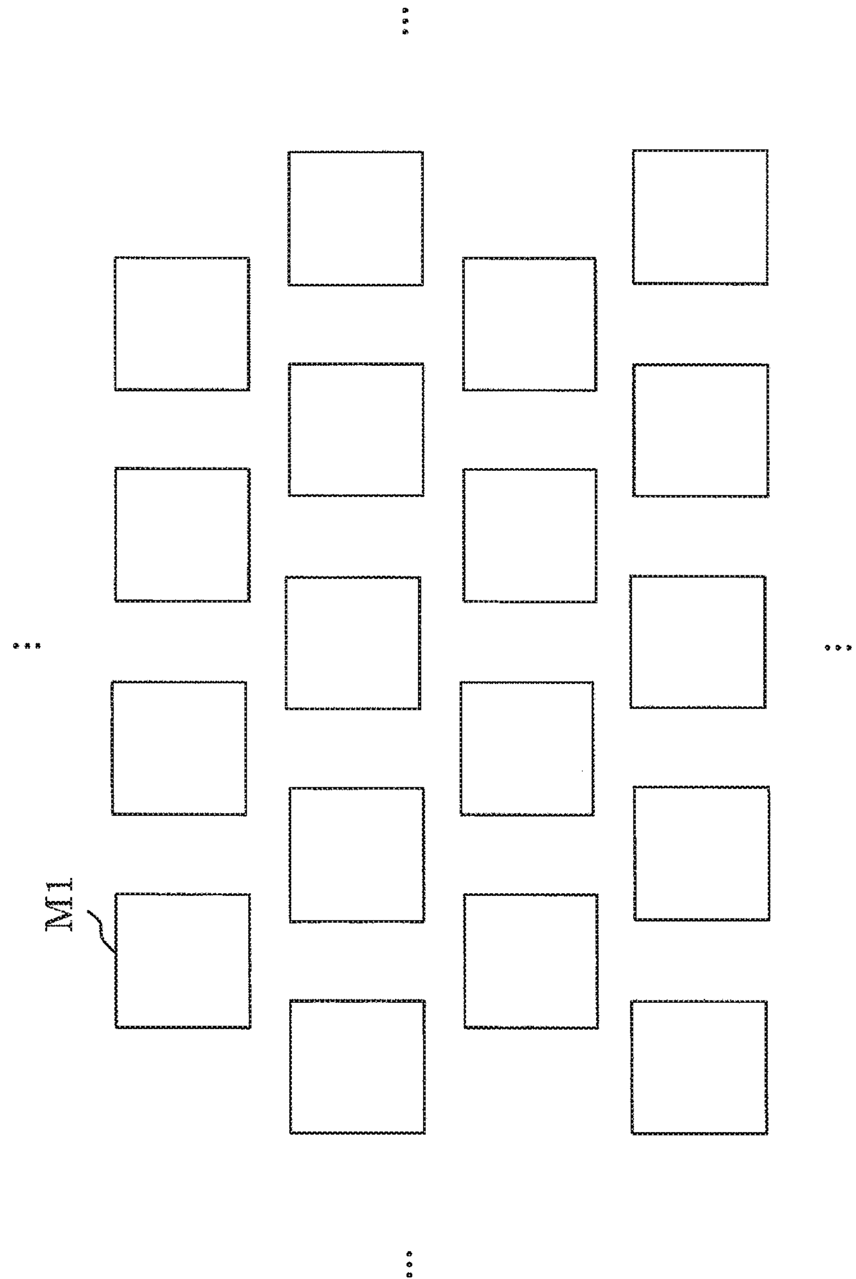
FIG. 3 is a schematic view for explaining a test mask pattern according to the first embodiment.

FIG. 3 is a schematic view for explaining the test mask pattern stored in the resist model estimation and display device according to the first embodiment. FIG. 3 schematically shows that an example of the test mask pattern 123 applied to the resist model estimation and display processing is distributed within a surface on which a resist pattern is transferred (hereinafter referred to as "a two-dimensional plane").

As shown in FIG. 3, the test mask pattern 123 is stored as, for example, information that shows a border indicating the presence or absence of a mask within the two-dimensional plane. As an example of the test mask pattern 123, FIG. 3 shows a plurality of rectangular masks M1 being distributed within the two-dimensional plane. The test mask pattern 123 is field proven by having been actually applied to a lithography device to transfer a resist pattern to a semiconductor substrate. The storage unit 12 of the resist model estimation and display device 10 further stores, as information to be paired with the test mask pattern 123, the test resist pattern 124 that is a resist pattern acquired by using the test mask pattern 123.

Figure 4:
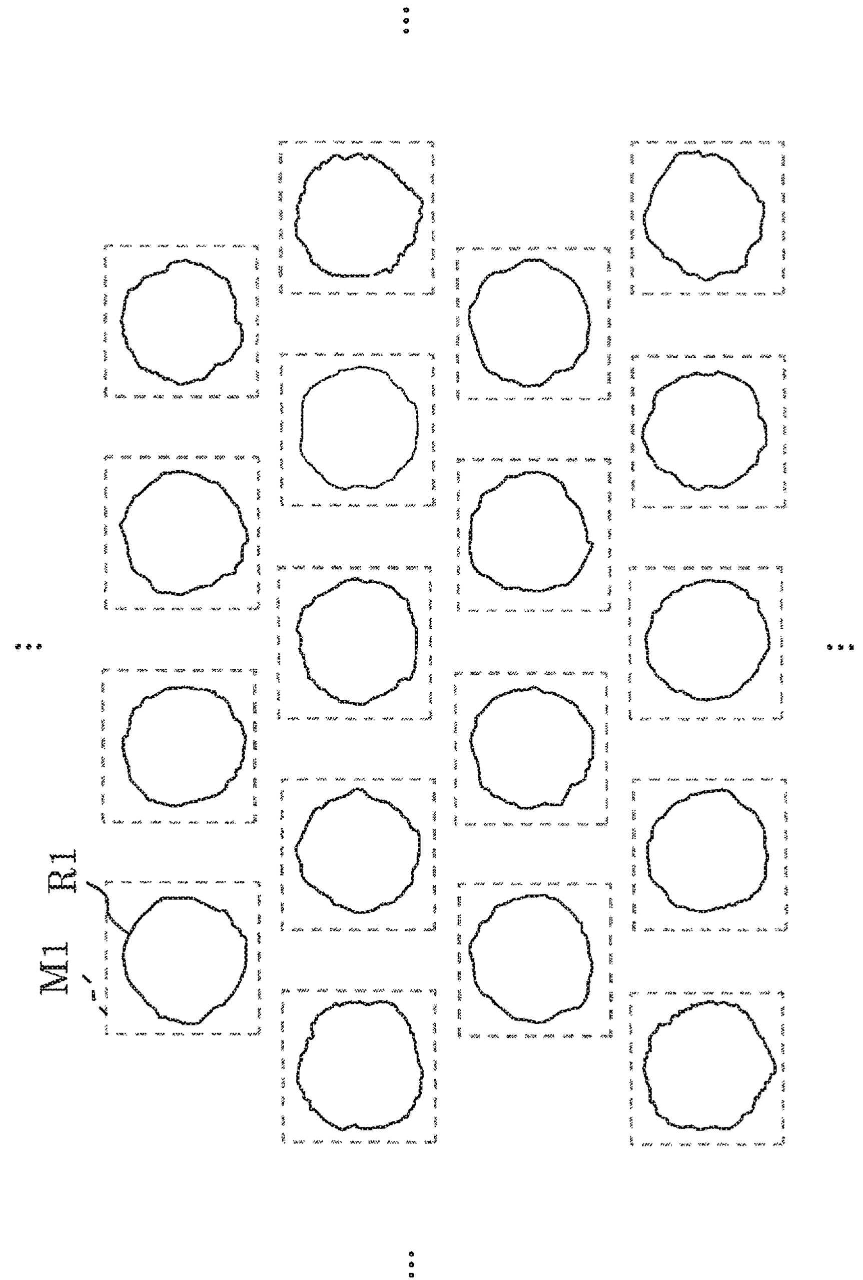
FIG. 4 is a schematic view for explaining a test resist pattern according to the first embodiment.

FIG. 4 is a schematic view for explaining the test resist pattern stored in the resist model estimation and display device according to the first embodiment. FIG. 4 schematically shows that an example of the test resist pattern 124 applied to the resist model estimation and display processing is distributed within the two-dimensional plane.

As shown in FIG. 4, the test resist pattern 124 is stored as, for example, information that shows a border indicating the presence or absence of a resist within the two-dimensional plane. The test resist pattern 124 may have a different shape from the test mask pattern 123. In the example of FIG. 4, a round resist R1 corresponding to the rectangular mask M1 is formed without the corner portions of the rectangular mask M1 being transferred.

The test resist pattern 124 does not necessarily correspond to the test mask pattern 123 on a one-to-one basis, and a plurality of test resist patterns 124 may correspond to one test mask pattern 123. Specifically, for example, if one test mask pattern 123 is transferred under a plurality of mutually-different conditions, mutually-different test resist patterns 124 may be respectively generated in accordance with the plurality of conditions. An example of parameters included in the plurality of conditions is a light exposure amount.

1.1.3 Hardware Configuration of Mask Pattern Design Device

Figure 5:
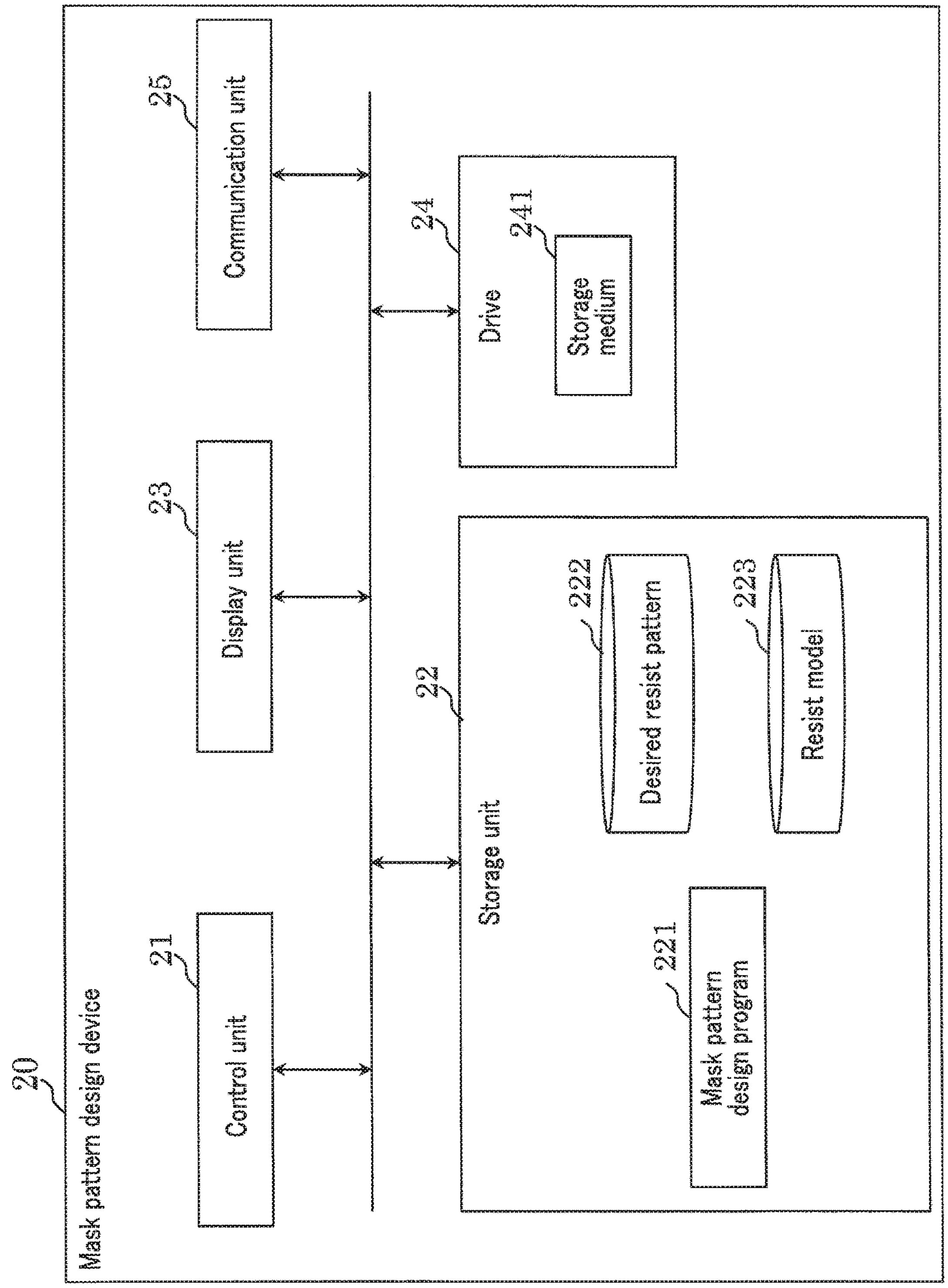
FIG. 5 is a block diagram for explaining a configuration of a mask pattern design device according to the first embodiment.

Next, a hardware configuration of the mask pattern design device according to the first embodiment will be described with reference to FIG. 5. FIG. 5 is a block diagram for explaining a hardware configuration of the mask pattern design device according to the first embodiment. As shown in FIG. 5, the mask pattern design device 20 includes a control unit 21, a storage unit 22, a display unit 23, a drive 24, and a communication unit 25.

The hardware configurations of the control unit 21 and the storage unit 22 are substantially the same as the hardware configurations of the control unit 11 and the storage unit 12 of the aforementioned resist model estimation and display device 10, respectively.

A mask pattern design program 221 to be executed in the mask pattern design device 20 is stored in the storage unit 22. As input information necessary for executing the mask pattern design program 221, a desired resist pattern 222 and a resist model 223, for example, are stored in the storage unit 22.

The mask pattern design program 221 is a program for causing, by applying the resist model 223, the mask pattern design device 20 to execute mask pattern design processing of designing a mask pattern with which the desired resist pattern 222 can be transferred. Details of the mask pattern design processing will be described later.

The desired resist pattern 222 is a simulation result, and not field proven by actually being transferred to a semiconductor substrate by the lithography device. In other words, the desired resist pattern 222 is a resist pattern which is expected to be generated by the mask pattern designed by the mask pattern design device 20. The desired resist pattern 222 is stored as, for example, information that shows a border indicating the presence or absence of a resist within the two-dimensional plane.

The resist model 223 is applied to a mathematical model which may achieve consistency between an optical image intensity calculated from a mask pattern and a resist image on a resist pattern. The resist model 223 is stored as, for example, a column vector with a given number of elements.

The optical image intensity is an intensity of an optical image projected in the resist at the time of light exposure. The resist image is an imaginary image acquired by performing a certain modulation to the optical image intensity (or a distribution of the optical image intensity). Specifically, the certain modulation refers to modulation processing performed so that a level line of a given value in a distribution of a resist image, which spreads over a certain area, matches the border of the resist pattern (a resist contour). Such a distribution of the resist image may physically correspond to a concentration distribution of a reaction product (acid, for example) generated in a resist by light.

The hardware configuration of the display unit 23 is substantially identical to the hardware configuration of the display unit 13 of the aforementioned resist model estimation and display device 10. The display unit 23 displays and notifies the user of the result of the execution of the mask pattern design program 221 that has been executed by the control unit 21.

The hardware configuration of the drive 24 is substantially identical to the hardware configuration of the drive 14 of the aforementioned resist model estimation and display device 10. A storage medium 241 that can be read by the drive 24 may store the above mask pattern design program 221.

The hardware configuration of the communication unit 25 is substantially the same as the hardware configuration of the communication unit 15 of the aforementioned resist model estimation and display device 10. The communication unit 25 receives, for example, the resist model 223 from the resist model estimation and display device 10, externally receives, for example, the desired resist pattern 222, and causes the storage unit 22 to store the resist model 223 and the desired resist pattern 222. The communication unit 25 outputs the mask pattern generated as the result of executing the mask pattern design program 221 to the external lithography device.

Figure 6:
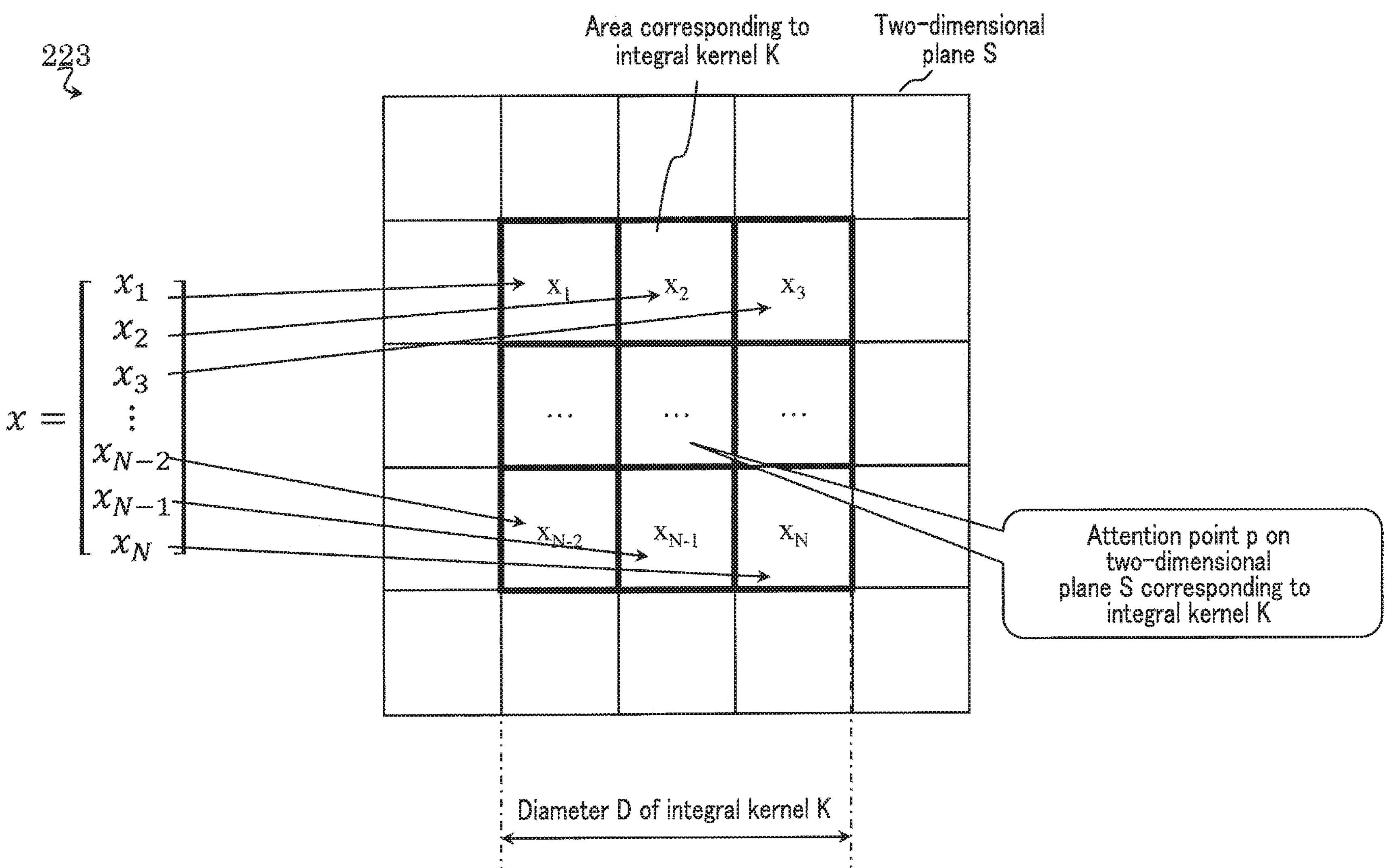
FIG. 6 is a schematic view for explaining a resist model according to the first embodiment.

FIG. 6 is a schematic view for explaining the resist model estimated in the resist model estimation and display device according to the first embodiment. FIG. 6 schematically shows the correspondence between the mathematical presentation in a case where the resist model 223 is referred to as a column vector x and the visual presentation in a case where the resist model 223 is referred to as an integral kernel K.

As shown in FIG. 6, the resist model 223 is mathematically presented as the integral kernel K of an integrating conversion which associates an optical image intensity I and a resist image I' with each other. In the description below, in this case, the resist image I' is expressed by Equation (1) below by using the optical image intensity I and the integral kernel K:

$$I'(r)=\int I(r-r')K(r')d^n r' \quad (1)$$

wherein $r \in R^n$, $r' \in R^n$, and $d^n r'$ represents the n-dimensional volume element.

If the above Equation (1) is discretized in two dimensions, for example, Equation (1) is reduced to a problem for calculating each of resist images I'(p), which are mapped on a two-dimensional plane S, at respective attention points p on the border of the resist pattern by calculating a linear sum. Herein, the attention points p are points discretionarily sampled from the border of the resist pattern or in the vicinity thereof.

One of the resist images I' (p) at corresponding attention point p is calculated by the linear sum of a product of each of components of the integral kernel K, which are allocated in the grids formed with the attention point p at the center, and the optical image intensity I corresponding to a point in the respective grids. In other words, the integral kernel K is visually presented as a set of elements corresponding to the grids formed in a certain area mapped on the two-dimensional plane S.

As an indicator which indicates the range of the integral kernel K on the two-dimensional plane S, a diameter D of the integral kernel K, for example, may be defined. The diameter D of the integral kernel K corresponds to a length of a side of a square having the attention point p at the center if the square is defined as the area of the integral kernel K. In the example of FIG. 6, the diameter D of the integral kernel K is "3". In this case, the number of elements N of the integral kernel K is "9" (=D^2) (N is an integer equal to or greater than 1).

Furthermore, the resist model 223 is mathematically presented as the column vector $x=(X_1, X_2, X_3, \ldots, X_{N-2}, X_{N-1}, X_N)^T$ that has N elements, which are visually defined as described above, as components. In the example of FIG. 6, components $x_1$ to $x_9$ (from the top-left to the bottom-right) are allocated to the square grids of three rows and three columns distributed on the two-dimensional plane S.

In this case, the optical image intensity I multiplied by the component of each element of the integral kernel K is mathematically presented as a column vector $a=(I_1, I_2, I_3, \ldots, I_{N-2}, I_{N-1}, I_N)^T$ that has N elements as components. A component $I_i$ ($1 \le i \le N$) of the column vector a indicates an optical image intensity at a position corresponding to a component $X_i$ of the column vector x.

By the above associations, Equation (1) resolves into a problem of calculating the resist image I'(p) at the attention point p by calculating an inner product $a^T x$ of the column vector a and the column vector x that are generated for the area having the attention point p at the center. In the description below, sets of intensities of the optical images and the resist images, which are calculated at a plurality of points in a certain area, will be respectively referred to as an "optical image intensity distribution" and a "resist image distribution". Accordingly, the column vector a may be referred to as an optical image intensity distribution corresponding to the range of the integral kernel K.

The above inner product calculation is easily extended to a case where a plurality of attention points are acquired by sampling and a resist image I' is calculated for each of the plurality of attention points. Specifically, if resist images I' at M attention points ($p_1, p_2, \ldots, p_M$) (M is a natural number) are regarded as a column vector $b=(I'(p_1), I'(p_2), \ldots, I'(p_M))$, an calculation to obtain the column vector b is expressed by Equation (2) below:

$$Ax=b \quad (2)$$

Herein, the matrix A is a matrix of M rows and N columns constituted by row vectors $a^T$ respectively generated at M attention points ($p_1, p_2, \ldots, p_m$). Accordingly, the matrix A may be referred to as a set of a plurality of optical image intensity distributions, each of which corresponds to the range of the integral kernel K.

In the description below, the matrix A, the column vector b, and the column vector x will be respectively referred to as an "optical image intensity distribution matrix A", a "resist image vector b", and an "integral kernel vector x". Accordingly, in the resist model estimation and display processing according to the first embodiment, estimation of the resist model 223 means estimating one integral kernel vector x which matches Equation (2) the best.

Each row vector $a^T$ constituting the optical image intensity distribution matrix A may be discretionarily weighted, and if such weighting is performed, the estimated integral kernel vector x is similarly weighted.

1.2 Functional Configuration

Next, a functional configuration of the mask pattern design system according to the first embodiment will be described.

1.2.1 Functional Configuration of Resist Model Estimation and Display Device

Functional configurations of the resist model estimation and display device according to the first embodiment will be described.

The control unit 11 of the resist model estimation and display device 10 loads, for example, the resist model estimation and display program 121 and the resist model validation program 122 stored in the storage unit 12 into the RAM. Subsequently, the control unit 11 interprets and executes the resist model estimation and display program 121 and the resist model validation program 122 loaded into the RAM, by the CPU, thereby controlling each structural element.

Figure 7:
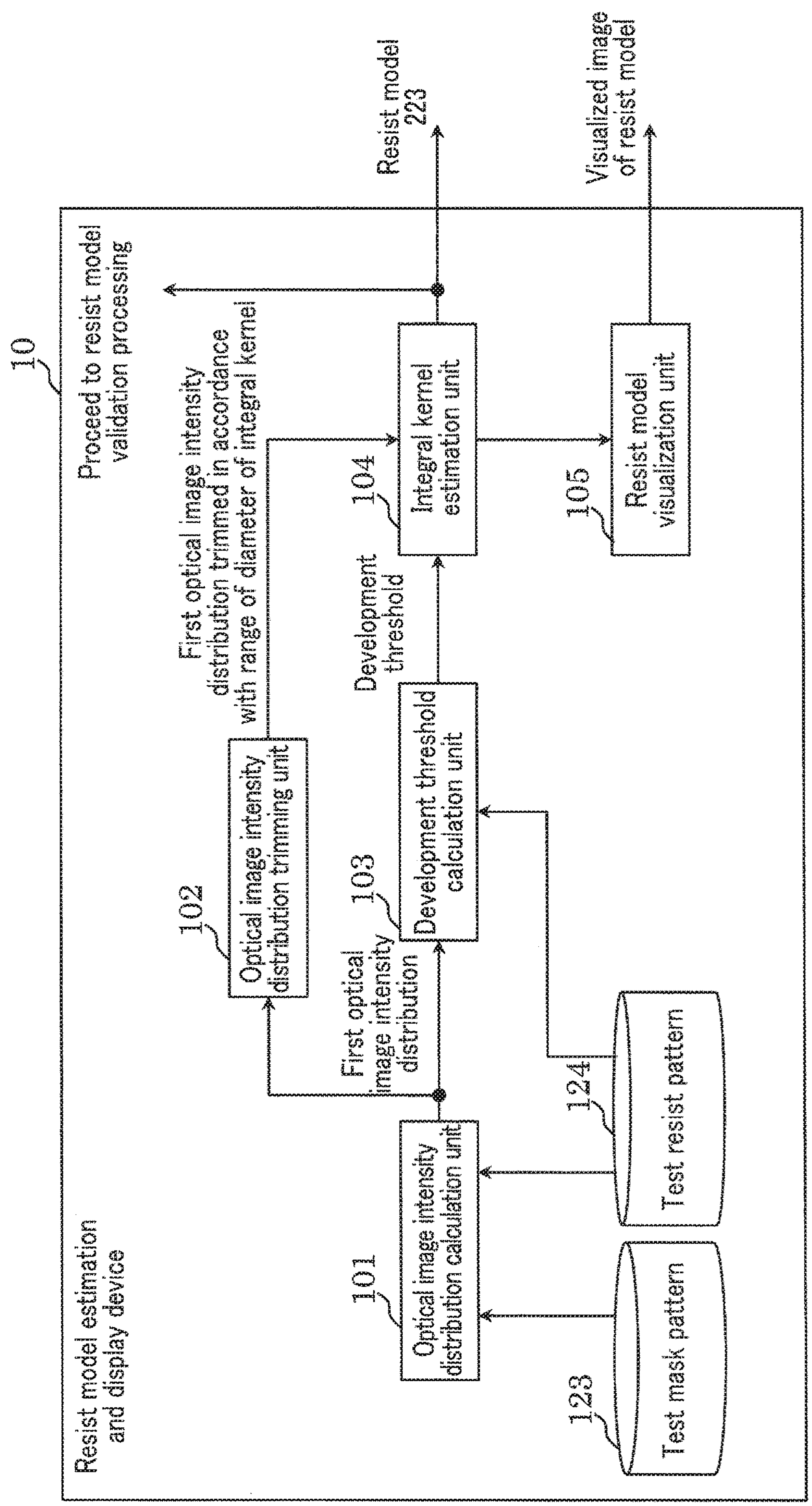
FIG. 7 is a block diagram for explaining a functional configuration of the resist model estimation and display device according to the first embodiment.

1.2.1.1 Functional Configuration for Resist Model Estimation and Display Processing Among the functional configurations of the resist model estimation and display device according to the first embodiment, a functional configuration for the resist model estimation and display processing will be described. FIG. 7 is a block diagram for explaining the functional configuration for the resist model estimation and display processing among the functional configurations of the resist model estimation and display device according to the first embodiment.

As shown in FIG. 7, when performing the resist model estimation and display processing, the resist model estimation and display device 10 functions as a computer that includes an optical image intensity distribution calculation unit 101, an optical image intensity distribution trimming unit 102, a development threshold calculation unit 103, an integral kernel estimation unit 104, and a resist model visualization unit 105.

The optical image intensity distribution calculation unit 101 reads the test resist pattern 124 from the storage unit 12, and samples the border portion of the resist on the two-dimensional plane S to acquire attention points. The optical image intensity distribution calculation unit 101 reads the test mask pattern 123 from the storage unit 12, and calculates optical image intensity distributions in respective areas each of which has the corresponding attention point acquired by sampling at the center based on the test mask pattern 123. In the description below, the optical image intensity distribution calculated around each attention point based on the test mask pattern 123 will be referred to as a "first optical image intensity distribution". The optical image intensity distribution calculation unit 101 sends the first optical image intensity distribution calculated with a certain space resolution around each attention point to the optical image intensity distribution trimming unit 102 and the development threshold calculation unit 103.

The optical image intensity distribution trimming unit 102 performs up-sampling, where necessary, on the first optical image intensity distribution calculated with a certain space resolution around each attention point. The up-sampling includes, for example, processing of multiplication of the sampling frequency in the frequency domain of the first optical image intensity distribution. Accordingly, the space resolution in the two-dimensional space domain of the up-sampled first optical image intensity distribution is an improvement on the space resolution in the two-dimensional space domain of the original first optical image intensity distribution. The optical image intensity distribution trimming unit 102 trims, from the up-sampled first optical image intensity distribution, a range defined by the diameter D of the integral kernel K (which indicates the resist model 223 to be estimated) in such a manner that the attention point is located at the center, and sends the trimmed range to the integral kernel estimation unit 104.

The development threshold calculation unit 103 calculates a development threshold at each of the attention points acquired by sampling from the border portion of the resist. For example, in the resist, a portion hosting the formation of an optical image with an intensity exceeding the development threshold is dissolved after development, thereby forming a pattern. Ideally, the resist images (development thresholds) on the border portion of the resist are required to be the same at attention points acquired by sampling any position of the border portion of the resist under environmental conditions with the same amount of light exposure, etc. For this purpose, the development threshold calculation unit 103 calculates an estimate value of a development threshold based on the optical image intensities at the plurality of attention points acquired by sampling.

Specifically, for example, the development threshold calculation unit 103 calculates, as a development threshold, an average value of the optical image intensities which respectively correspond to the plurality of attention points acquired by sampling a resist pattern generated with a certain light exposure amount. For the method of calculating a development threshold, any value is applicable regardless of the average value of the extracted optical image intensities.

Thus, the development threshold calculation unit 103 calculates the same development threshold for a plurality of attention points acquired by sampling resist patterns (the same test resist pattern 124) which are generated with the same light exposure amount. The development threshold calculation unit 103 sends the calculated development threshold of each test resist pattern 124 to the integral kernel estimation unit 104.

Upon receiving the plurality of first optical image intensity distributions trimmed with respect to the plurality of attention points from the optical image intensity distribution trimming unit 102, the integral kernel estimation unit 104 generates the optical image intensity distribution matrix A based on the plurality of first optical image intensity distributions. Furthermore, upon receiving the development thresholds for the plurality of attention points from the development threshold calculation unit 103, the integral kernel estimation unit 104 generates the resist image vector b based on the plurality of development thresholds. The integral kernel estimation unit 104 solves a linear equation Ax=b, based on the optical image intensity distribution matrix A, and the resist image vector b. specifically, the integral kernel estimation unit 104 estimates the integral kernel vector x by solving a minimization problem of a cost function F expressed by Equation (3) below:

$$F=\|b-Ax\|^2 \tag{3}$$

The integral kernel estimation unit 104 may adopt various solution methods to estimate the integral kernel vector x.

For example, the integral kernel estimation unit 104 may estimate the integral kernel vector x by solving a least squares problem if the linear equation Ax=b is an overdetermined system, and by solving a least squares minimum norm problem if the linear equation Ax=b is an undetermined system.

The integral kernel estimation unit 104 may perform singular value decomposition of the optical image intensity distribution matrix A, and estimate the integral kernel vector x by using a generalized inverse matrix which is generated by using significant singular values and significant singular value vectors. (This estimation method may be referred to as "the estimation method by singular value decomposition" hereinafter.) Furthermore, the integral kernel estimation unit 104 may estimate the integral kernel vector x via regularization in which a regularization term is introduced to the above Equation (3). (In the description below, this estimation method may be referred to as "the estimation method by regularization" hereinafter.)

The integral kernel estimation unit 104 sends the estimated integral kernel vector x, as a resist model, to the resist model visualization unit 105 and the mask pattern design device 20.

If the integral kernel vector x is estimated by the above estimation method by singular value decomposition, or regularization, the integral kernel estimation unit 104 sends the number of the significant singular values or the value of the regularization term, respectively, (the number of the significant singular values or the value of the regularization term may be collectively referred to as an "estimation parameter" hereinafter) used for the estimation of the integral kernel vector x, in addition to the integral kernel vector x, to the resist model visualization unit 105.

The resist model visualization unit 105 maps the integral kernel vector x estimated by the integral kernel estimation unit 104 on the two-dimensional plane in accordance with the visual presentation of the integral kernel K shown in FIG. 6, thereby visualizing the resist model 223 to display the resist model 223 on the display unit 13. If the resist model visualization unit 105 receives the estimation parameter from the integral kernel estimation unit 104 in addition to the resist model 223, the resist model visualization unit 105 may associate the visualized resist model 223 with the estimation parameter to present the visualized resist model 223 and the estimation parameter to the user.

1.2.1.2 Functional Configuration for Resist Model Validation Processing

Figure 8:
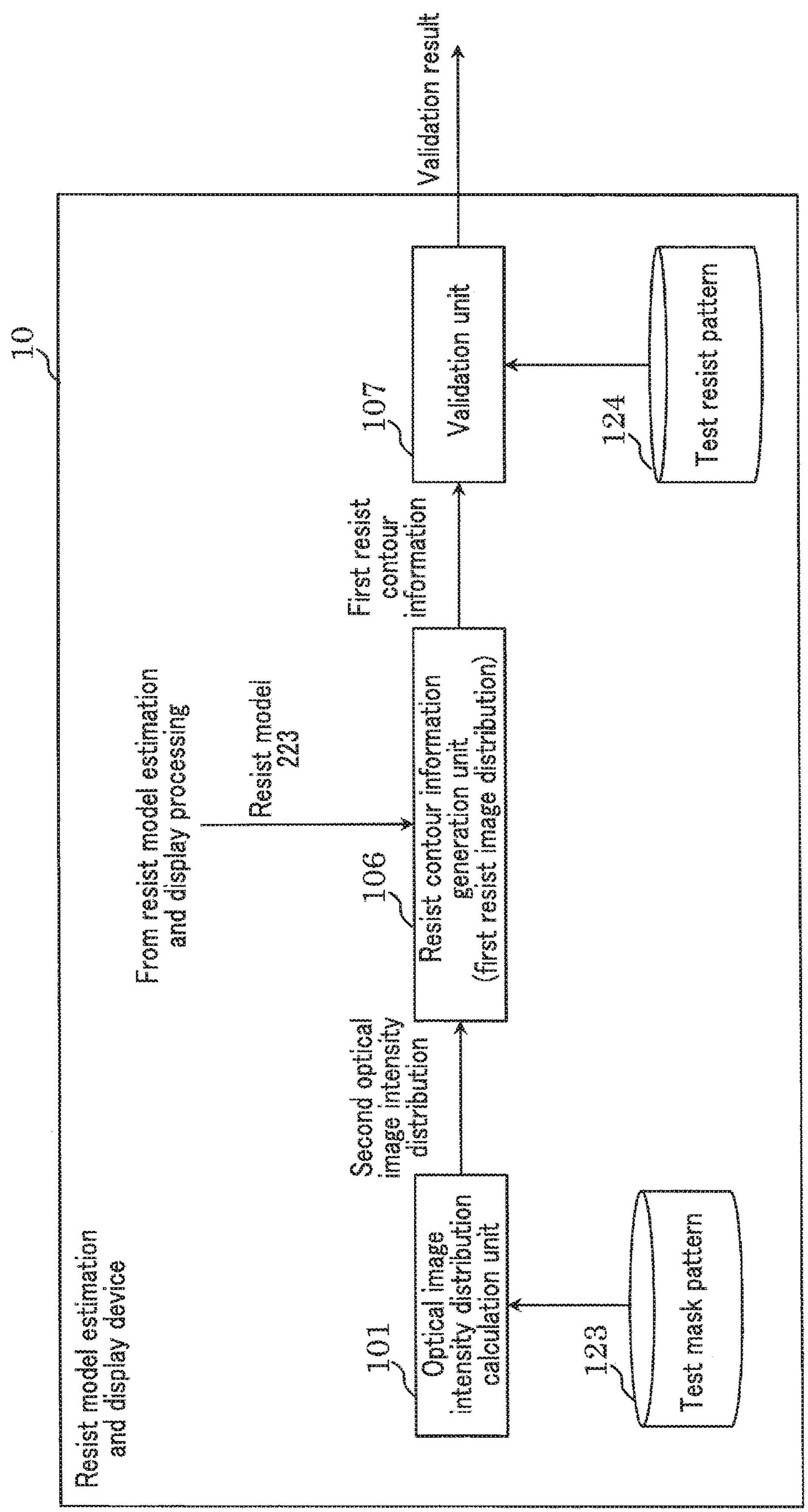
FIG. 8 is a block diagram for explaining a functional configuration of the resist model estimation and display device according to the first embodiment.

A functional configuration for the resist model validation processing among the functional configurations of the resist model estimation and display device according to the first embodiment will be described. FIG. 8 is a block diagram for explaining the functional configuration for the resist model validation processing among the functional configurations of the resist model estimation and display device according to the first embodiment.

As shown in FIG. 8, when performing the resist model validation processing, the resist model estimation and display device 10 functions as a computer that includes a resist contour information generation unit 106 and a validation unit 107 in addition to the optical image intensity distribution calculation unit 101 explained in FIG. 7.

The optical image intensity distribution calculation unit 101 reads the test mask pattern 123 from the storage unit 12 and calculates an optical image intensity for each of grids over the entire two-dimensional plane, thereby calculating the optical image intensity distribution. In the description below, the optical image intensity distribution calculated over the entire two-dimensional plane based on the test mask pattern 123 will be referred to as a "second optical image intensity distribution". The optical image intensity distribution calculation unit 101 sends the acquired second optical image intensity distribution to the resist contour information generation unit 106. The test mask pattern 123 used for the resist model validation processing may be either identical, or different, to the test mask pattern 123 used for the resist model estimation and display processing.

Upon receiving the second optical image intensity distribution, the resist contour information generation unit 106 calculates a resist image distribution over the entire two-dimensional plane based on the resist model 223 estimated by the integral kernel estimation unit 104 in the resist model estimation and display processing. In the description below, the resist image distribution over the entire two-dimensional plane calculated based on the second optical image intensity distribution and the resist model 223 will be referred to as a "first resist image distribution". The resist contour information generation unit 106 generates first resist contour information based on the calculated first resist image distribution, and sends the first resist contour information to the validation unit 107. In other words, the first resist contour information is obtained by generating, based on the first resist image distribution, information indicating the borderline (an estimated resist pattern) distinguishing the area exceeding the development threshold and the area not exceeding the development threshold in the two-dimensional plane.

Upon receiving the first resist contour information, the validation unit 107 reads the test resist pattern 124 corresponding to the test mask pattern 123 used by the optical image intensity distribution calculation unit 101. The validation unit 107 validates the validity of the resist model 223 used for generating the first resist contour information by comparing the first resist contour information with the test resist pattern 124, and presents the validation result to the user. The validation result includes, for example, a matching degree between the first resist contour information and the test resist pattern 124. Specifically, the validation unit 107 may, for example, superimpose the first resist contour information and the test resist pattern 124 to display them on the display unit 13, and display the matching degree therebetween, thereby presenting the validation result to the user.

1.2.2 Functional Configuration of Mask Pattern Design Device

A functional configuration of the mask pattern design device according to the first embodiment will be described.

The control unit 21 of the mask pattern design device 20 loads, for example, the mask pattern design program 221 stored in the storage unit 22 into the RAM. Then, the control unit 21 interprets and executes the mask pattern design program 221 loaded into the RAM by the CPU, thereby controlling each structural element.

Figure 9:
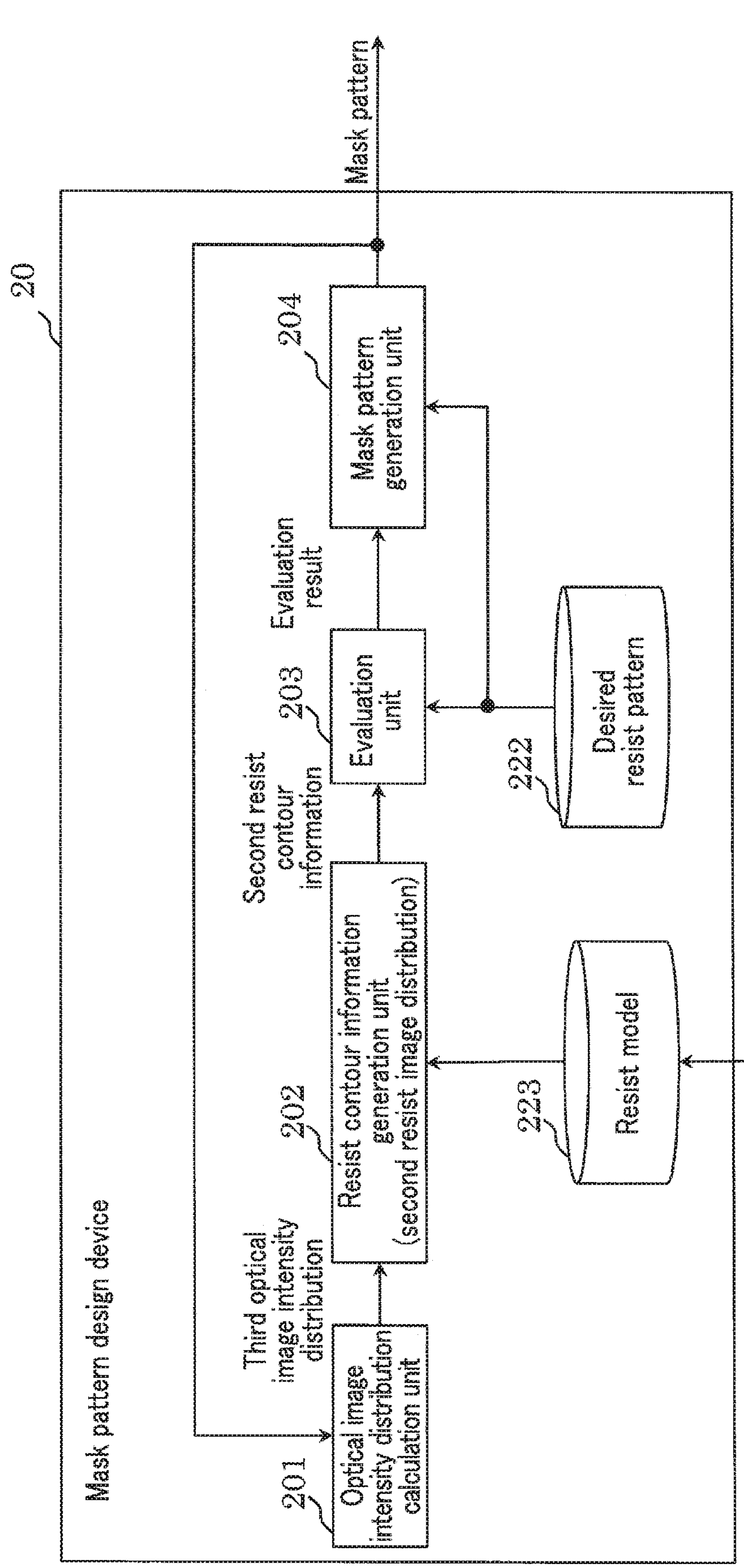
FIG. 9 is a block diagram for explaining a functional configuration of the mask pattern design device according to the first embodiment.

FIG. 9 is a block diagram for explaining the functional configuration of the mask pattern design device according to the first embodiment.

As shown in FIG. 9, when performing the mask pattern design processing, the mask pattern design device 20 functions as a computer that includes an optical image intensity distribution calculation unit 201, a resist contour information generation unit 202, an evaluation unit 203, and a mask pattern generation unit 204.

The functional configurations of the optical image intensity distribution calculation unit 201 and the resist contour information generation unit 202 are substantially the same as the functional configurations of the optical image intensity distribution calculation unit 101 and the resist contour information generation unit 106 in the resist model estimation and display device 10 explained in FIG. 8, respectively.

In other words, upon receiving a mask pattern from the mask pattern generation unit 204, the optical image intensity distribution calculation unit 201 calculates an optical image intensity with respect to each of grids over the entire two-dimensional plane based on the mask pattern, thereby calculating the optical image intensity distribution. In the description below, the optical image intensity distribution calculated over the entire two-dimensional plane based on a mask pattern from the mask pattern generation unit 204 will be referred to as a "third optical image intensity distribution". The optical image intensity distribution calculation unit 201 sends the acquired third optical image intensity distribution to the resist contour information generation unit 202.

Upon receiving the third optical image intensity distribution over the entire two-dimensional plane, the resist contour information generation unit 202 calculates a resist image distribution over the entire two-dimensional plane based on the resist model 223 received from the resist model estimation and display device 10. In the description below, the resist image distribution over the entire two-dimensional plane calculated based on the third optical image intensity distribution and the resist model 223 will be referred to as a "second resist image distribution". The resist contour information generation unit 202 generates second resist contour information based on the calculated second resist image distribution, and sends the second resist contour information to the evaluation unit 203. In other words, the second resist contour information is obtained by generating, based on the second resist image distribution, information indicating the borderline (an estimated resist pattern) distinguishing the area exceeding the development threshold and the area not exceeding the development threshold in the two-dimensional plane.

Upon receiving the second resist contour information, the evaluation unit 203 reads the desired resist pattern 222 from the storage unit 22. The evaluation unit 203 evaluates the validity of the mask pattern used for generation of the second resist contour information by comparing the second resist contour information with the desired resist pattern 222, and then sends the evaluation result to the mask pattern generation unit 204. The evaluation result includes, for example, whether or not the second resist contour information satisfies a predetermined standard for configuring a circuit to be realized by the desired resist pattern 222.

The mask pattern generation unit 204 determines whether or not to redesign a mask pattern based on the evaluation result from the evaluation unit 203. If the mask pattern generation unit 204 determines to redesign a mask pattern as a result of the determination, the mask pattern generation unit 204 redesigns a mask pattern that may improve the evaluation result by performing, for example, an optical proximity correction (OPC), and sends the redesigned mask pattern to the optical image intensity distribution calculation unit 201. Furthermore, if the mask pattern generation unit 204 determines not to redesign a mask pattern as a result of the determination, the mask pattern generation unit 204 sends a mask pattern corresponding to the evaluation result to the external device. Specifically, the mask pattern generation unit 204 may present the evaluation result to the user by, for example, displaying a mask pattern of which designing is completed on the display unit 23 in accordance with the form shown in FIG. 3.

1.3 Operation

Next, operation of the mask pattern design system according to the first embodiment will be described.

1.3.1 Overall Operation

First, an overall operation of the mask pattern design system according to the first embodiment will be described with reference to a flowchart shown in FIG. 10.

Figure 10:
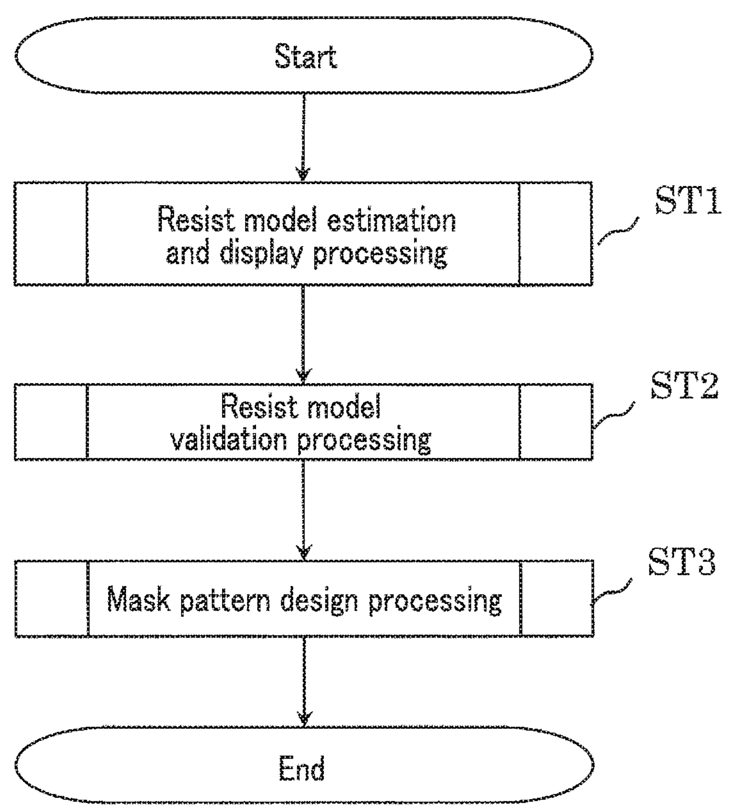
FIG. 10 is a flowchart for explaining an overall operation in the mask pattern design system according to the first embodiment.

As shown in FIG. 10, in step ST1, the resist model estimation and display device 10 performs the resist model estimation and display processing. By this processing, the resist model estimation and display device 10 estimates the resist model 223, and displays the estimation result to the user.

In step ST2, the resist model estimation and display device 10 performs the resist model validation processing. As a result, the resist model estimation and display device 10 can validate whether or not the resist model 223 displayed in the step ST1 is valid.

In step ST3, the mask pattern design device 20 designs a mask pattern by using the resist model 223 which is determined to be valid as a result of the validation in the step ST2. As a result, the mask pattern design device 20 can design a mask pattern that can generate the desired resist pattern, and can provide the mask pattern to the lithography device.

The overall operation ends with this operation.

1.3.2 Resist Model Estimation and Display Operation

Next, the resist model estimation and display operation in the resist model estimation and display device according to the first embodiment will be described. For the resist model estimation and display operation described below, a case where a method of estimating a resist model by singular value decomposition is applied will be described as an example.

1.3.2.1 Flowchart

Figure 11:
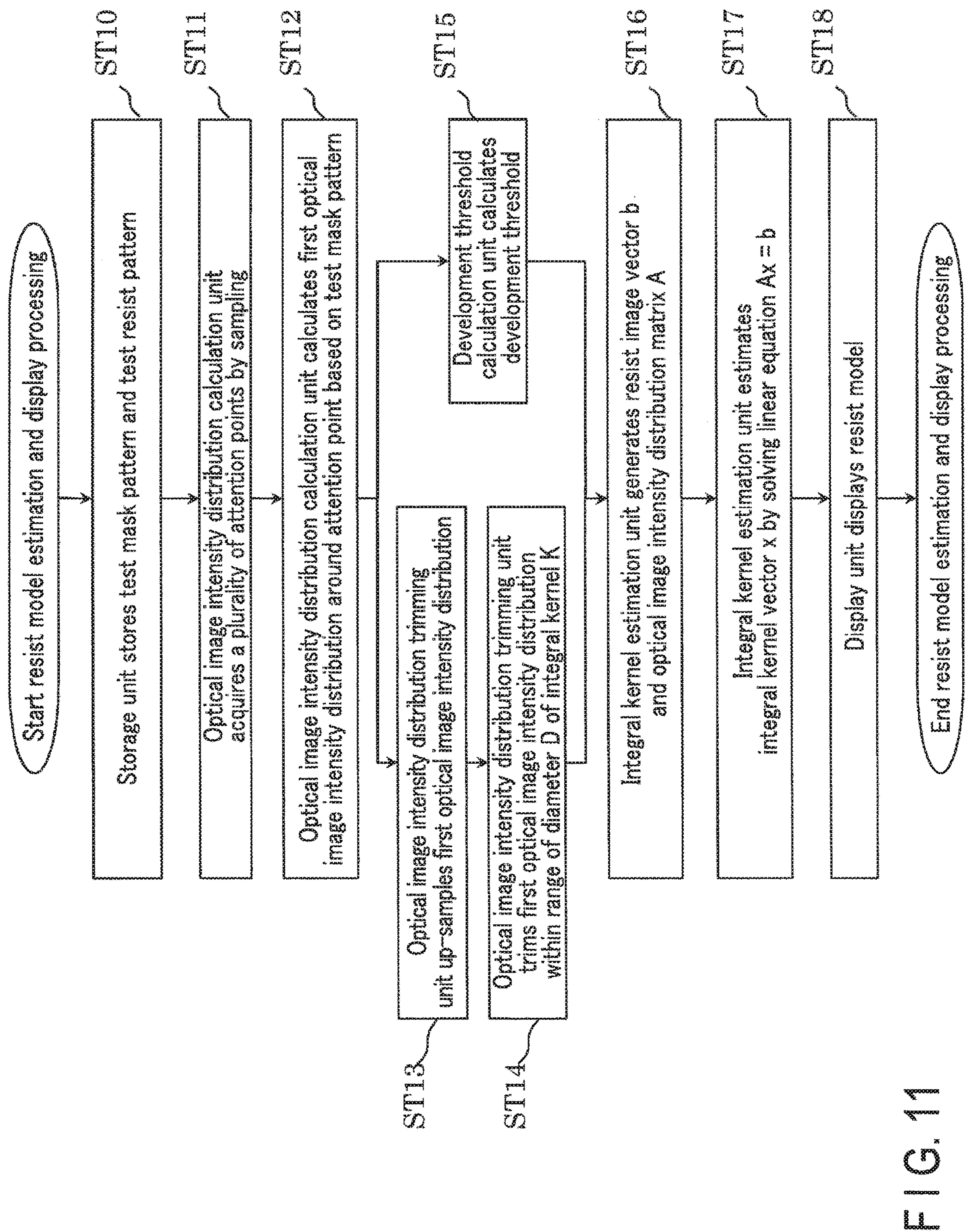
FIG. 11 is a flowchart for explaining a resist model estimation and display operation in the resist model estimation and display device according to the first embodiment.

FIG. 11 is a flowchart for explaining the resist model estimation and display operation in the resist model estimation and display device according to the first embodiment. FIG. 11 corresponds to the details of the step ST1 explained in FIG. 10.

As shown in FIG. 11, in step ST10, the storage unit 12 stores the test mask pattern 123 and the test resist pattern 124 externally input via the communication unit 15.

In step ST11, the control unit 11 functions as the optical image intensity distribution calculation unit 101, and samples points located on the border of the resist to acquire a plurality of attention points based on the test resist pattern 124.

In step ST12, the control unit 11 continues to function as the optical image intensity distribution calculation unit 101, and calculates the first optical image intensity distributions around the respective plurality of attention points acquired by sampling in the step ST11 based on the test mask pattern 123.

In step ST13, the control unit 11 functions as the optical image intensity distribution trimming unit 102, and up-samples the first optical image intensity distributions respectively calculated for the plurality of attention points in the step ST12.

In step ST14, the control unit 11 continues to function as the optical image intensity distribution trimming unit 102, and trims each of the first optical image intensity distributions up-sampled in the step ST13 within the range which has the diameter D of the integral kernel K and has corresponding attention point at the center.

In step ST15, the control unit 11 functions as the development threshold calculation unit 103, and calculates development thresholds based on the plurality of attention points acquired by sampling in the step ST11.

In step ST16, the control unit 11 functions as the integral kernel estimation unit 104, and generates the optical image intensity distribution matrix A and the resist image vector b based on the first optical image intensity distributions, each of which has been trimmed within the range having the diameter D of the integral kernel K in the step ST14, and the development thresholds calculated in the step ST15, respectively.

In step ST17, the control unit 11 continues to function as the integral kernel estimation unit 104, and estimates the integral kernel vector x by solving the linear equation Ax=b based on the optical image intensity distribution matrix A and the resist image vector b generated in the step ST16.

Specifically, the control unit 11 performs singular value decomposition of the optical image intensity distribution matrix A in accordance with Equation (4) below:

$$A = U\Lambda V^t \tag{4}$$

$$(UU^t = VV^t = I,\ \Lambda = \mathrm{diag}(\sigma_1, \sigma_2, \ldots, \sigma_N))$$

wherein the matrix U is a unitary matrix of M columns and M rows, and the matrix V is a unitary matrix of N columns and N rows. The matrix I is a unit matrix. Values $\sigma_1$ to $\sigma_N$ are singular values of the optical image intensity distribution matrix A.

It is known that, generally, the greater a singular value is, the more significantly the singular value contributes to an estimated solution. Accordingly, the control unit 11 selects, from the N acquired singular values, n (≤N) singular values in descending order as significant singular values. The control unit 11 generates a generalized inverse matrix $A^+$ by using the n selected singular values in accordance with Equation (5) below:

$$A^+ = V\Lambda^{-1}U^t \tag{5}$$

$$\left(\Lambda^{-1} = \mathrm{diag}\left(\frac{1}{\sigma_1}, \frac{1}{\sigma_2}, \ldots, \frac{1}{\sigma_n}\right)\right)$$

Then, the control unit 11 estimates the integral kernel vector x by using the generated generalized inverse matrix $A^+$ in accordance with Equation (6) below:

$$x=A^+b \tag{6}$$

In step ST18, the control unit 11 functions as the resist model visualization unit 105, and displays the integral kernel vector x estimated in the step ST17 as a resist model on the display unit 13. Specifically, the display unit 13 displays the resist model that is mapped on the two-dimensional plane by the resist model visualization unit 105, and is visualized so as to be visually recognizable for a user.

The resist model estimation and display operation ends with this operation.

1.3.2.2 Sampling Operation to Acquire Attention Points

FIG. 12 is a schematic view for explaining the sampling operation to acquire attention points in the resist model estimation and display operation according to the first embodiment. FIG. 12 corresponds to the step ST11 explained in FIG. 11.

As shown in FIG. 12, a test resist pattern 124*a* includes a round resist R1, and a test resist pattern 124*b* includes a round resist R2. The two test resist patterns 124*a* and 124*b* show resist patterns, for example, in cases where the same test mask pattern 123 is transferred with different light exposure amounts. In the example of FIG. 12, the test resist pattern 124*a* is a resist pattern transferred with a larger light exposure amount than the test resist pattern 124*b*.

Furthermore, in the example of FIG. 12, the number M of the attention points is "10". Specifically, the optical image intensity distribution calculation unit 101 samples the border of the round resist R1 to acquire five attention points p1, p2, p3, p4, and p5. The optical image intensity distribution calculation unit 101 also samples the border of the round resist R2 to acquire five attention points p6, p7, p8, p9, and p10. The attention points are preferably acquired by sampling the border of the resist, for example, at regular intervals, so as to be acquired in an exhaustive manner.

The optical image intensity distribution calculation unit 101 calculates the first optical image intensity distributions each of which have a corresponding attention point, that is, one of the attention points p1 to p10, at the center.

1.3.2.3 Operation of Generating Optical Image Intensity Distribution Matrix

Figure 13:
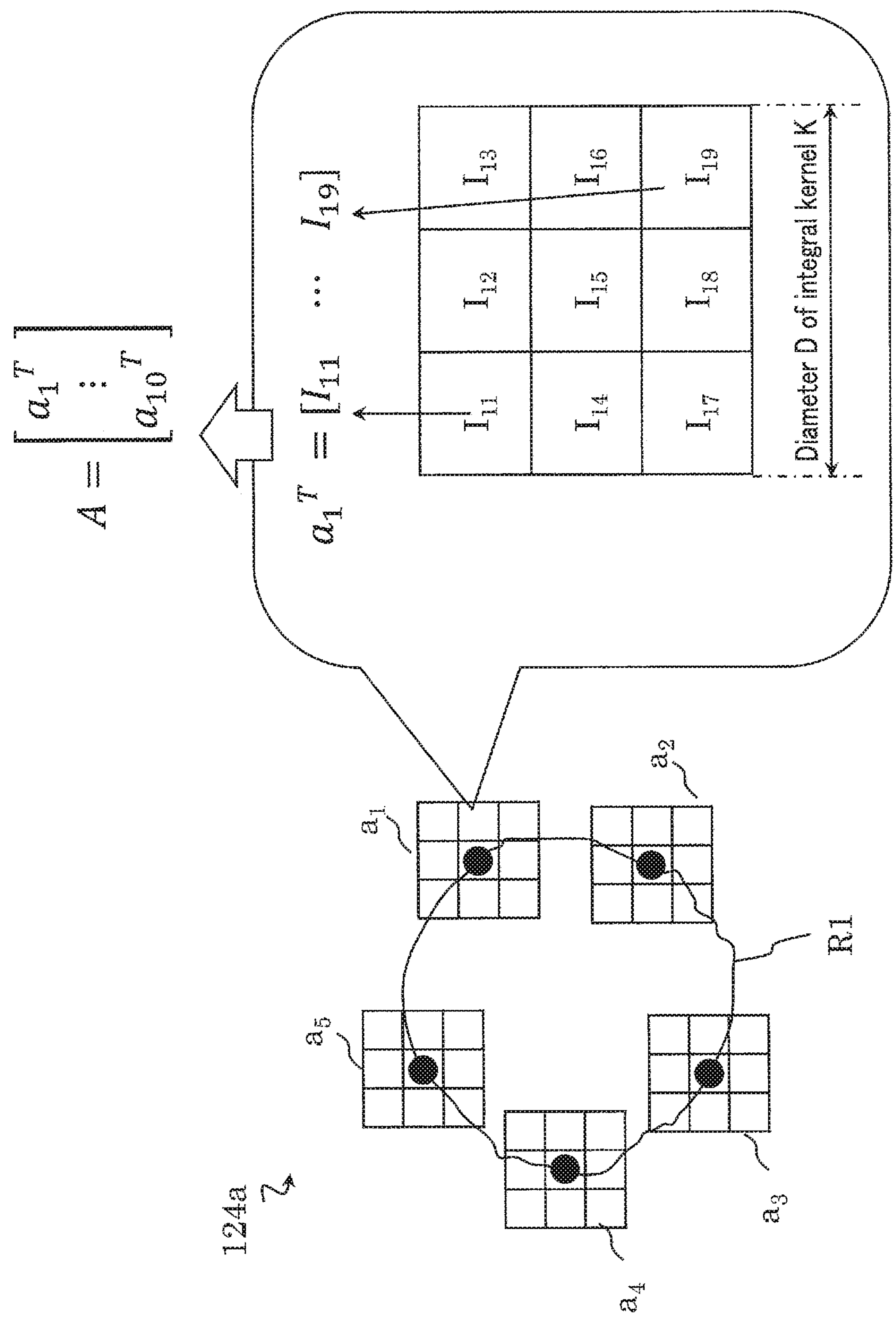
FIG. 13 is a schematic view for explaining an operation which generates an optical image intensity distribution matrix in the resist model estimation and display operation according to the first embodiment.

FIG. 13 is a schematic view for explaining the operation which generates the optical image intensity distribution matrix in the resist model estimation and display operation according to the first embodiment. FIG. 13 corresponds to the steps ST14 and ST16 explained in FIG. 11. Furthermore, to simplify the explanation, FIG. 13 shows the test resist pattern 124*a* among the test resist patterns 124*a* and 124*b* explained in FIG. 12.

As shown in FIG. 13, the optical image intensity distribution trimming unit 102 sets areas a1 to a5 respectively having the attention points p1 to p5 acquired by sampling in the step ST11 at the center. The areas a1 to a5 are substantially the same in size, and the size is defined by the diameter D of the integral kernel K. The diameter D of the integral kernel K is set preliminarily. The example of FIG. 13 indicates a case where the diameter D of the integral kernel K is "3". Thus, the number of elements N of the areas a1 to a5 is "9 (=3^ 2)".

The optical image intensity distribution trimming unit 102 trims nine optical image intensities (as a first optical image intensity distribution to be sent to the integral kernel estimation unit 104) which correspond to each of the areas a1 to a5 from the first optical image intensity distribution calculated around each of the attention points p1 to p5. Specifically, the optical image intensity distribution trimming unit 102 extracts nine optical image intensities ($I_{11}$, $I_{12}$, $I_{13}$, $I_{14}$, $I_{15}$, $I_{16}$, $I_{17}$, $I_{18}$, and $I_{19}$) (as a first optical image intensity distribution to be sent to the integral kernel estimation unit 104) corresponding to the area a1 from the first optical image intensity distribution calculated around the attention point p1.

The integral kernel estimation unit 104 generates a row vector $a_1^T=(I_{11}, I_{12}, I_{13}, I_{14}, I_{15}, I_{16}, I_{17}, I_{18}, I_{19})$ based on the nine optical image intensities $I_{11}$ to $I_{19}$ (the first optical image intensity distribution) trimmed with respect to the attention point p1. Furthermore, the integral kernel estimation unit 104 generates row vectors $a_2^T$ to $a_{10}^T$ based on respective nine optical image intensities (a first optical image intensity distribution) trimmed with respect to each of the other attention points p2 to p10. The integral kernel estimation unit 104 combines the 10 generated row vectors $a_1^T$ to $a_{10}^T$ in the row direction. As a result, the optical image intensity distribution matrix A of M rows and N columns (10 rows and 9 columns) is generated.

1.3.2.4 Operation of Generating Resist Image Vector

Figure 14:
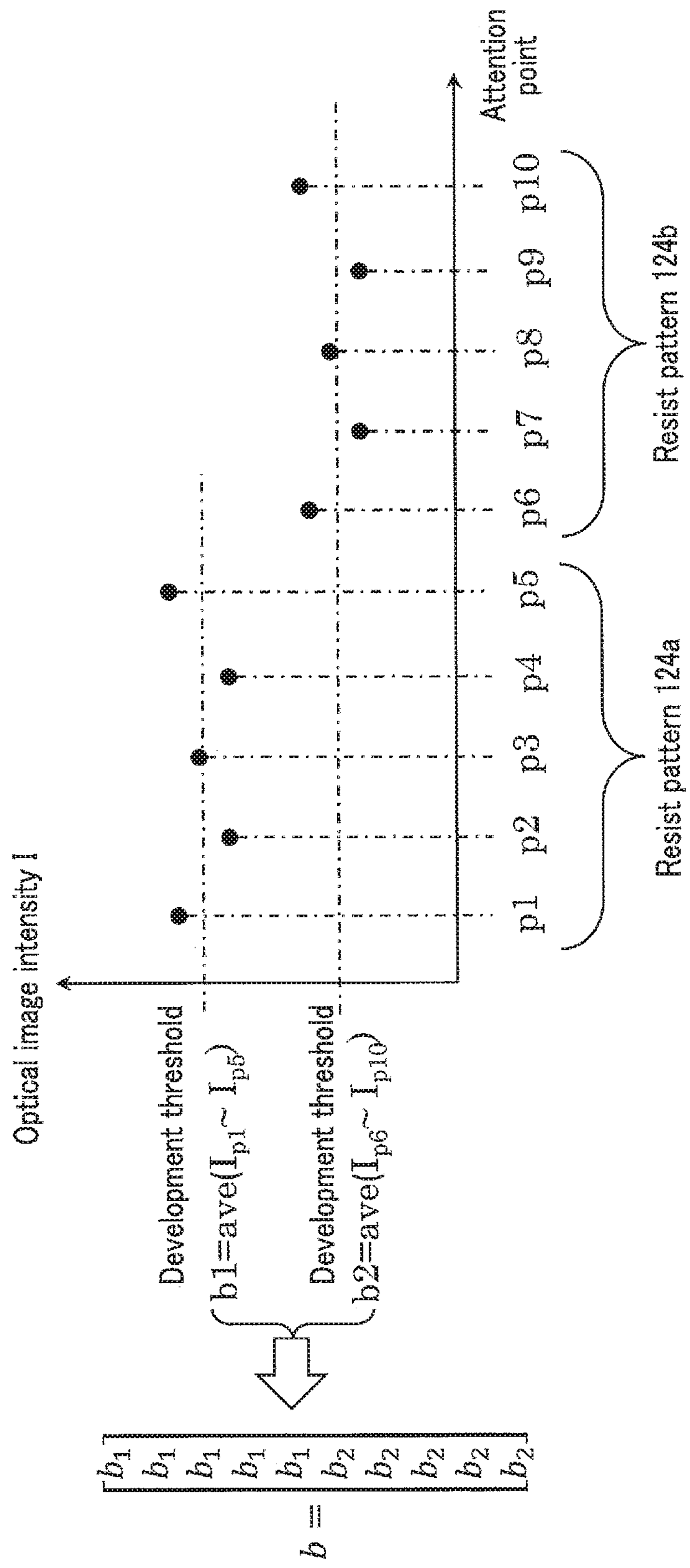
FIG. 14 is a schematic view for explaining an operation which generates a resist image vector in the resist model estimation and display operation according to the first embodiment.

FIG. 14 is a schematic view for explaining the operation which generates a resist image vector in the resist model estimation and display operation according to the first embodiment. FIG. 14 corresponds to the steps ST15 and ST16 explained in FIG. 11.

As shown in FIG. 14, the development threshold calculation unit 103 extracts optical image intensities $I_{p1}$ to $I_{p10}$ on the respective attention points p1 to p10, and divides them into groups, each of which has the same resist pattern. In the example of FIG. 14, the development threshold calculation unit 103 divides the optical image intensities $I_{p1}$ to $I_{p10}$ into two groups: a group of the optical image intensities $I_{p1}$ to $I_{p5}$ corresponding to the test resist pattern 124*a* and a group of the optical image intensities $I_{p5}$ to $I_{p10}$ corresponding to the test resist pattern 124*b*.

The development threshold calculation unit 103 calculates an average value of the optical image intensities for each divided group, and regards the average value as a development threshold for the corresponding attention points. Specifically, the development threshold calculation unit 103 calculates an average value $b1=ave(I_{p1}, \ldots, I_{p5})=(I_{p1}+I_{p2}+I_{p3}+I_{p4}+I_{p5})/5$ for the group of the optical image intensities $I_{p1}$ to $I_{p5}$. The average value b1 is regarded as a development threshold for each of the corresponding attention points p1 to p5. The development threshold calculation unit 103 also calculates an average value $b2=ave(I_{p6}, \ldots, I_{p10})=(I_{p6}+I_{p7}+I_{p8}+I_{p9}+I_{p10})/5$ for the group of the optical image intensities $I_{p6}$ to $I_{p10}$. The average value b2 is regarded as a development threshold for each of the corresponding attention points p6 to p10.

The integral kernel estimation unit 104 combines the 10 development thresholds (five development thresholds b1 and five development thresholds b2) respectively calculated for the attention points p1 to p10 in the row direction. As a result, the resist image vector b having M (=10) elements is generated.

1.3.2.5 Visualization Operation of Resist Model

Figure 16:
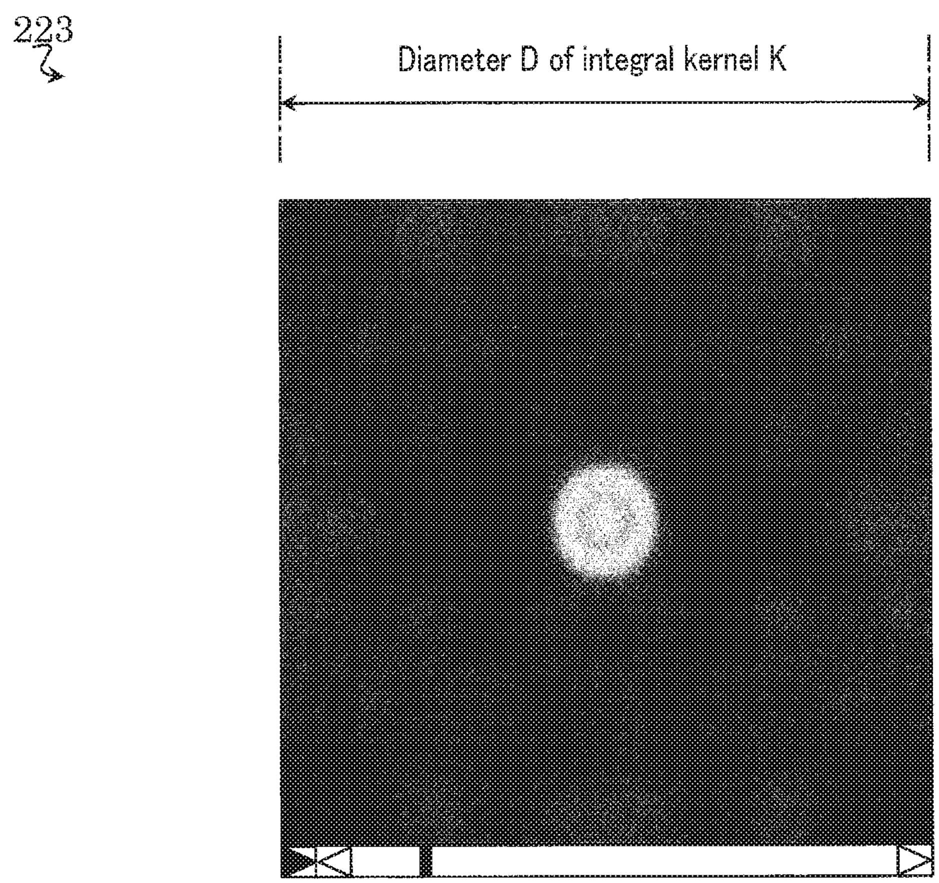
FIG. 16 is a schematic view for explaining the resist model visualized in the resist model estimation and display operation according to the first embodiment.

FIGS. 15 to 17 are schematic views for explaining the resist model visualized in the resist model estimation and display operation according to the first embodiment. FIGS. 15 to 17 correspond to the step ST18 explained in FIG. 11. FIG. 15 visually shows the resist model 223 estimated if an appropriate number of singular values are selected. FIGS. 16 and 17 visually show the resist model 223 estimated if an appropriate number of singular values are not selected.

Specifically, FIG. 16 shows the resist model 223 in a case where the number of the selected singular values is insufficient. FIG. 17 shows the resist model 223 in a case where the number of selected singular values is excessive.

As shown in FIGS. 15 to 17, the resist model 223 is associated with the number of the singular values used for the estimation to be output to the user, for example, by using a scroll bar shown at the bottom. The resist model 223 is also mapped to the area corresponding to the integral kernel K explained in FIG. 6. Accordingly, the center portion of the area where the resist model 223 is mapped corresponds to the position of an attention point. In the examples of FIGS. 15 to 17, the resist model 223 is shown by shading in accordance with the magnitude relationship between values of the components of the elements of the integral kernel vector x. This enables the user to visually understand the rate at which the optical image intensities in the area around the attention point contribute to the resist image at said attention point.

With reference to the resist model 223 shown in FIG. 15, the user can understand that a contribution rate is high at the center point and its proximity, and reduces with decreasing proximity to the center point in the estimated resist model 223. It is known that, generally, a resist model is modeled so that the envelope has a normal distribution, as shown in FIG. 15. Thus, by referring to FIG. 15, the user can visually confirm that a resist model 223 in a desired shape is estimated via estimation based on the selected singular values. The shape of the resist model 223 assumed to be a desired shape may be of any shape which enables the user to regard the envelope as having a similar shape to a normal distribution by visual confirmation, and the envelope need not necessarily be of strictly normal distribution.

With reference to the resist model 223 shown in FIG. 16, the user can understand that the estimated resist model 223 has a shape where the envelope has a similar shape to a normal distribution, but the difference between the center portion and the surrounding portion is not clearly shown compared with the resist model 223 shown in FIG. 15. Thus, by referring to FIG. 16, the user can visually confirm that a resist model 223 having a desired shape is not estimated via the estimation based on the selected singular values.

Furthermore, with reference to the resist model 223 shown in FIG. 17, the user can understand that the estimated resist model 223 has a shape where the envelope does not have a normal distribution, in which larger contributions other than the center portion are sporadically seen more than the resist model 223 shown in FIG. 15. Thus, by referring to FIG. 17, the user can visually confirm that a resist model 223 having a desired shape is not estimated via the estimation based on the selected singular values.

In FIGS. 15 to 17, the cases where the resist model 223 is shown by shading in accordance with the magnitude relationship between values of the components of the elements of the integral kernel vector x is explained, but the configuration is not limited thereto. For example, as shown in FIG. 18, the resist model 223 may be three-dimensionally output to the user in such a manner that the values of the components of the elements of the integral kernel vector x are presented in the vertical axis direction.

1.3.2.6 Operation of Truncating Insignificant Singular Values

As described above, the resist model 223 may not be correctly estimated if an appropriate number of singular values are not selected. Thus, it is preferable that the number of singular values applied for the estimation is appropriately determined.

Figure 19:
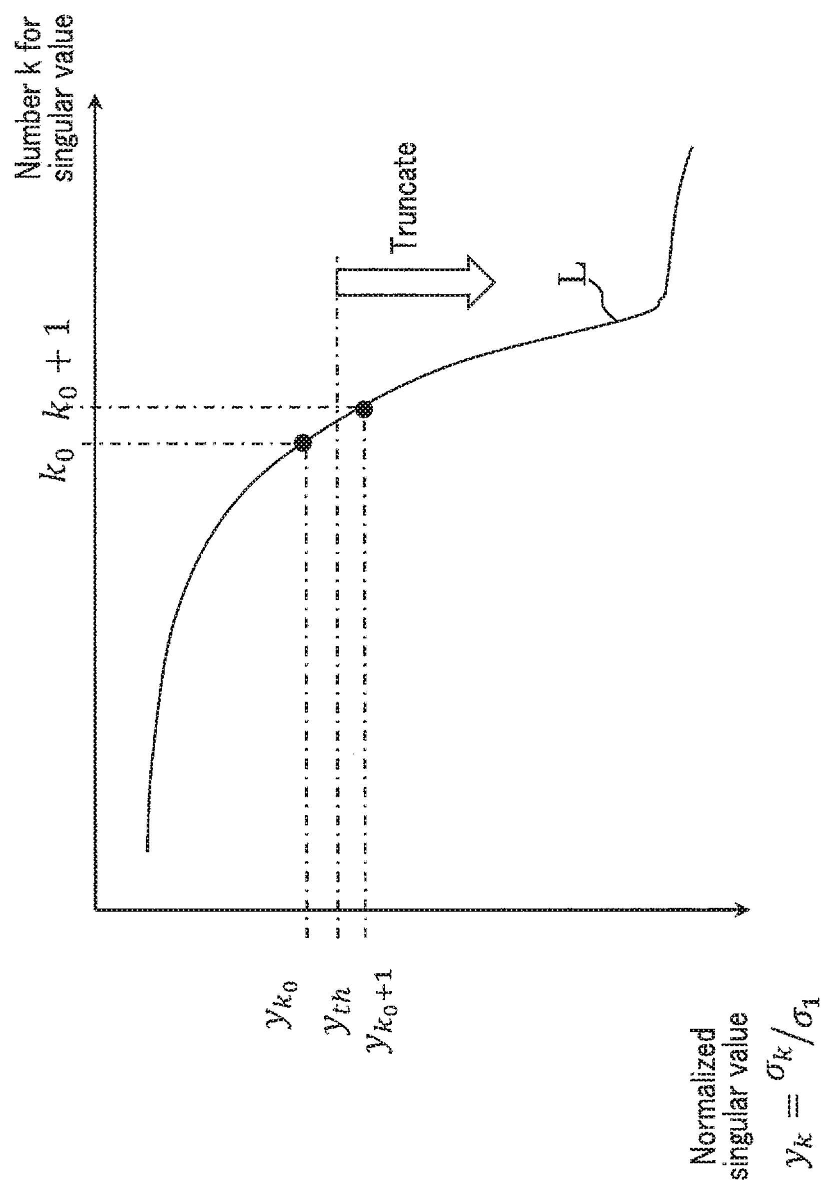
FIG. 19 is a schematic diagram for explaining an operation which truncates insignificant singular values in the resist model estimation and display operation according to the first embodiment.

FIG. 19 is a diagram for explaining the operation which truncates insignificant singular values in the resist model estimation and display operation according to the first embodiment. FIG. 19 corresponds to the step ST17 explained in FIG. 11. In the example of FIG. 19, a number k (1, 2, . . . , N) is allocated to each of N singular values calculated in the step ST17 from the largest singular value to the smallest singular value. Specifically, in the example of FIG. 19, the largest singular value is expressed as $\sigma_1$, the $k_0$th largest singular value is expressed as $\sigma_{k0}$, and the $(k_0+1)$th largest singular value is expressed as $\sigma_{k0+1}$.

As shown in FIG. 19, a curve L is acquired by plotting a singular value $y_k$ with a number k for a singular value defined as a horizontal axis and a normalized singular value $y_k=\sigma_k/\sigma_1$ defined as a vertical axis. In FIG. 19, lower part of the vertical axis corresponds to a smaller singular value $y_k$. In order to acquire a significant estimated solution, it is preferable that singular values having the number corresponding to the lower right portion of the curve L are eliminated from estimation of the integral kernel vector x.

The integral kernel estimation unit 104, for example, sets a predetermined threshold $y_{th}$ for the normalized singular value $y_k$, and truncates singular values smaller than the threshold $y_{th}$. In the example of FIG. 19, since it is defined that $y_{k0}>y_{th}>y_{k0+1}$, $(k_0+1)$th and the subsequent singular values are truncated. As a result, singular values of excessively small values can be eliminated from the estimation, and a sufficient number of singular values can be applied to the estimation. The method of truncating the singular values may be any method as long as the singular values are truncated before the slope of the curve L significantly changes and the singular value $y_k$ suddenly decreases. Thus, the method of truncating the singular values is not limited to the above method, and a discretionary method may be applied thereto.

1.3.3. Resist Model Validation Operation

Next, the resist model validation operation in the resist model estimation and display device according to the first embodiment will be described with reference to a flowchart shown in FIG. 20. FIG. 20 corresponds to the details of the step ST2 explained in FIG. 10.

As shown in FIG. 20, in step ST20, the storage unit 12 stores the test mask pattern 123 externally input via the communication unit 15 and the resist model 223 estimated by the integral kernel estimation unit 104.

In step ST21, the control unit 11 functions as the optical image intensity distribution calculation unit 101, and calculates the second optical image intensity distribution over the two-dimensional plane based on the test mask pattern 123.

In step ST22, the control unit 11 functions as the resist contour information generation unit 106, and generates the first resist contour information based on the second optical image intensity distribution calculated in the step ST21 and the resist model 223 estimated in the step ST10.

In step ST23, the control unit 11 functions as the validation unit 107, and compares the first resist contour information generated in the step ST22 with the test resist pattern 124. Specifically, for example, the control unit 11 may calculate a matching degree between the first resist contour information and the test resist pattern 124. Furthermore, the control unit 11 may present the result of the comparison between the first resist contour information and the test resist pattern 124 to the user by displaying the result on the display unit 13.

In step ST24, the control unit 11 continues to function as a validation unit 107, and determines whether or not the resist model 223 is valid. The control unit 11 may evaluate the validity of the resist model 223 based on, for example, whether or not the matching degree between the first resist contour information and the test resist pattern 124 exceeds the predetermined threshold. If the resist model 223 is determined to be invalid ("no" in the step ST24), the process returns to step ST10, and the resist model estimation and display operation is performed. If the resist model 223 is determined to be valid ("yes" in the step ST24), the process proceeds to step ST25.

In step ST25, the control unit 11 continues to function as the validation unit 107, and outputs validation results of the step ST23 and the step ST24 to the user. Specifically, for example, the display unit 13 may display the validation results.

Whereby, the resist model validation processing ends.

1.3.4 Mask Pattern Design Operation

Figure 21:
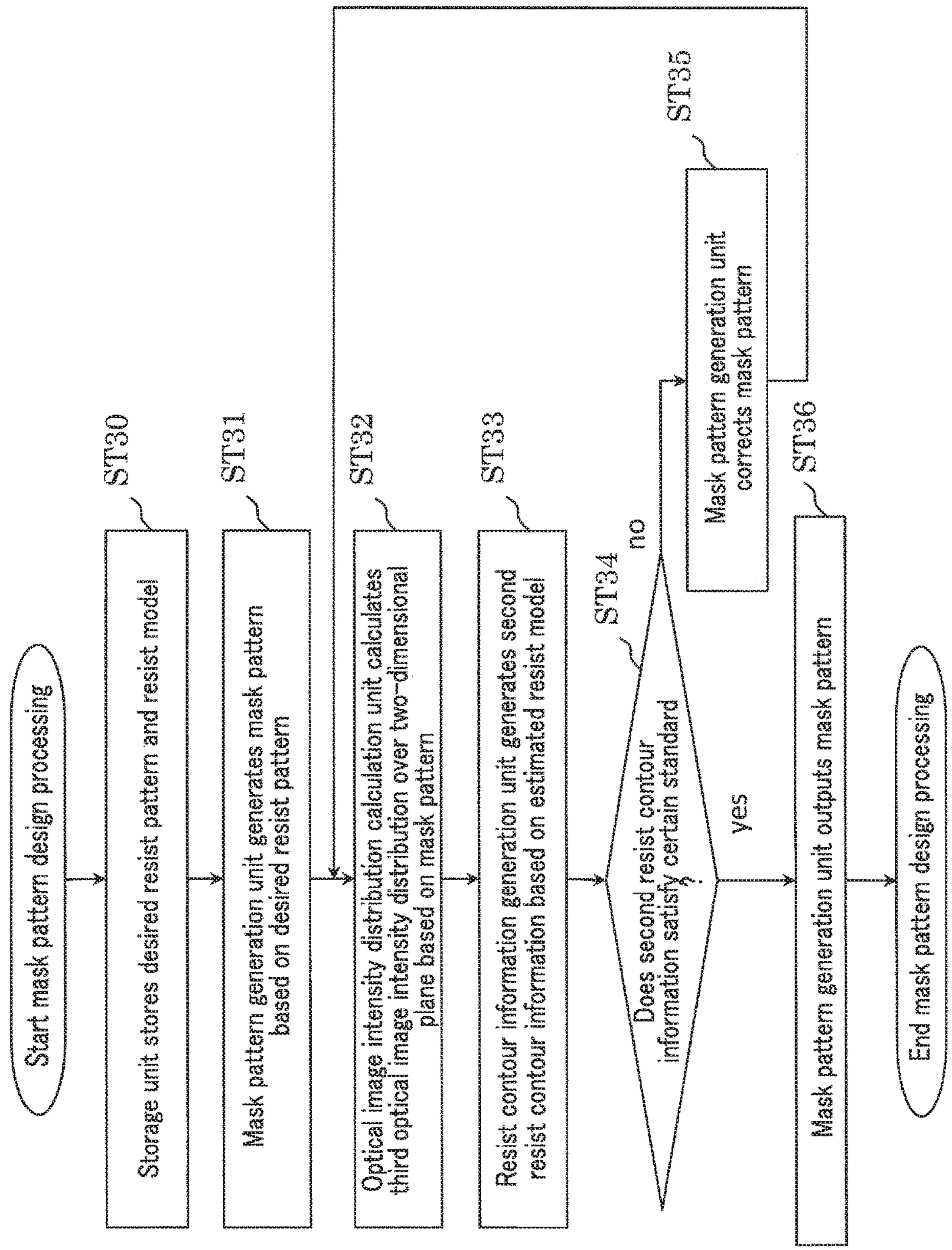
FIG. 21 is a flowchart for explaining a mask pattern design operation in the mask pattern design device according to the first embodiment.

Next, mask pattern design operation in the mask pattern design device according to the first embodiment will be described with reference to a flowchart shown in FIG. 21. FIG. 21 corresponds to the details of the step ST3 explained in FIG. 10.

As shown in FIG. 21, in step ST30, the storage unit 22 stores the desired resist pattern 222 externally input via the communication unit 25, and the resist model 223 input from the resist model estimation and display device 10.

In step ST31, the control unit 21 functions as the mask pattern generation unit 204, and generates a mask pattern based on the desired resist pattern 222.

In step ST32, the control unit 21 functions as the optical image intensity distribution calculation unit 201, and calculates the third optical image intensity over the two-dimensional plane based on the mask pattern generated in the step ST31.

In step ST33, the control unit 21 functions as the resist contour information generation unit 202, and generates the second resist contour information based on the third optical image intensity distribution calculated in the step ST32 and the resist model 223 validated in the step ST20.

In step ST34, the control unit 21 functions as the evaluation unit 203, and evaluates whether or not the second resist contour information generated in the step ST33 satisfies a predetermined standard. If it is determined that the predetermined standard is not satisfied ("no" in the step ST34), the process proceeds to step ST35, and if it is determined that the predetermined standard is satisfied ("yes" in the step ST34), the process proceeds to step ST36.

In the ST35, the control unit 21 functions as the mask pattern generation unit 204, corrects the mask pattern generated in the step ST31, and performs steps the ST32 to the ST34 again.

In the step ST36, the control unit 21 functions as a mask pattern generation unit 204, and outputs the mask pattern determined to satisfy the predetermined standard in step the ST34 to an external device such as the lithography device. The control unit 21 may output the mask pattern along with the evaluation result in the step ST34. Furthermore, the control unit 21 may cause the display unit 23 to display the mask pattern determined to satisfy the predetermined standard.

The mask pattern design processing ends with this operation.

1.4 Advantageous Effects of Present Embodiment

According to the first embodiment, the estimation accuracy of the resist model may be improved while suppressing a calculation load. This advantageous effect will be described below.

According to the first embodiment, the optical image intensity distribution calculation unit 101 acquires a plurality of attention points by sampling, and calculates a first optical image intensity distribution of the area corresponding to the diameter D of the integral kernel K around each of the attention points. The development threshold calculation unit 103 calculates a development threshold for each of the attention points acquired by sampling. The integral kernel estimation unit 104 estimates a resist model indicating the integral kernel K in a size of the diameter D by solving the linear equation $Ax=b$ based on the optical image intensity distribution matrix A and the resist image vector b. As a result, estimation of a resist model is equivalent to estimation of each component of one integral kernel vector x. Thus, the integral kernel estimation unit 104 can estimate a resist model as a discretionary shape, and can improve consistency between the resist model and the test pattern.

Furthermore, as described above, the integral kernel estimation unit 104 can estimate a resist model by solving the linear equation. Accordingly, in the load for estimation, the calculation load can be reduced compared with other estimation methods such as combination optimization. Moreover, a resist model is not only modeled as one integral kernel K, but may also be modeled by a linear sum from a plurality of physical models. If a resist model is modeled by a linear sum from a plurality of physical models, the constitutive parameter of each physical model is estimated so as to be consistent with the entire plurality of physical models. Such a problem resolves into a combination optimization problem of minimizing the cost function F. Thus, if the number of parameters of the physical models increases, an enormous amount of time is required for acquiring an optimized solution. On the other hand, in the first embodiment, the integral kernel estimation unit 104 can estimate the integral kernel vector x by a direct solution method of a linear equation. Accordingly, even if the number of the parameters (the diameter D of the integral kernel K) increases, the amount by which the calculation load increases can be suppressed compared with the case of solving the combination optimization problem. Thus, the estimation accuracy of the resist model can be improved while suppressing the calculation load.

The resist model visualization unit 105 maps the estimated integral kernel vector x on a two-dimensional plane or a three-dimensional space, for example. This enables the display unit 13 to present the visualized resist model to the user. As a result, it is possible to present, to the user, a means for visually determining whether the estimation result by the resist model estimation and display device 10 is valid or not.

When performing the estimation, the integral kernel estimation unit 104 selects significant singular values by performing singular value decomposition of the optical image intensity distribution matrix A, and estimates the integral kernel vector x by using only the selected singular values. As a result, it is possible to avoid the integral kernel vector x from becoming a meaningless estimation under the influence of measuring errors included in the resist contour information.

The integral kernel estimation unit 104 may determine the number of singular values to be selected in accordance with a predetermined algorithm, but may also estimate the integral kernel vector x for the case of selecting a discretionary number of singular values by gradually changing a number of singular values to be selected. In this case, the resist model visualization unit 105 provides the user with a number of selected singular values and an integral kernel vector x estimated in accordance with the number of selected singular values. This enables the user to visually understand the relationship between the integral kernel vector x and a number of the singular values.

The mask pattern design device 20 designs a mask pattern by using the estimated resist model. This enables a resist image distribution to be calculated by using the resist model of which validity is validated by the test pattern. Accordingly, it is possible to more accurately predict a shape of a mask pattern necessary for acquiring a desired resist pattern.

2. Second Embodiment

Next, a resist model estimation and display device according to a second embodiment will be described.

In the first embodiment, the method of estimating a resist model for converting an optical image intensity distribution to a resist image distribution as the integral kernel vector x calculated by solving the linear equation Ax=b is described. However, the configuration is not limited thereto. For example, a resist model may be estimated as an integral kernel vector x' that directly associates a distribution (for example, a mask transmittance distribution indicating a mask pattern) adopted in a design stage earlier than an optical image intensity distribution. In the descriptions below, the configurations and operations similar to those in the first embodiment are omitted, and mainly the configurations and operations similar to those in the first embodiment are described.

2.1 Functional Configuration of Resist Model Estimation and Display Device

Figure 22:
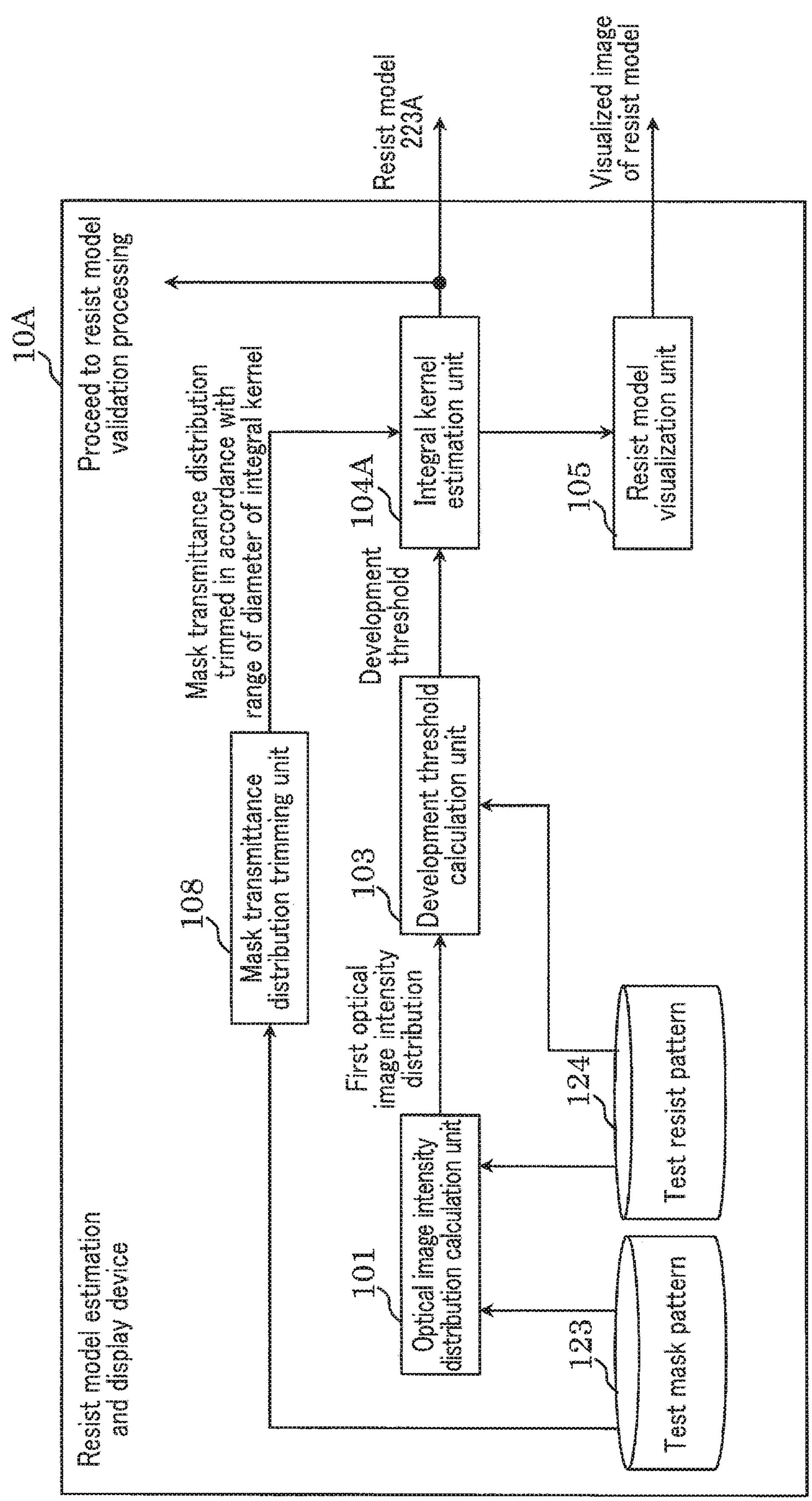
FIG. 22 is a block diagram for explaining a functional configuration of a resist model estimation and display device according to a second embodiment.

Functional configurations of a resist model estimation and display device according to the second embodiment will be described. FIG. 22 is a block diagram for explaining a functional configuration for resist model estimation and display processing among the functional configurations of the resist model estimation and display device according to the second embodiment.

When performing the resist model estimation and display processing, the resist model estimation and display device 10A functions as a computer that includes an integral kernel estimation unit 104A in place of the integral kernel estimation unit 104, and further includes a mask transmittance distribution trimming unit 108.

The mask transmittance distribution trimming unit 108 reads a test mask pattern 123 from a storage unit 12, and calculates a rectangular function (a mask transmittance distribution) generated around each of the attention points according to a shape of a mask pattern. In other words, the mask transmittance distribution may be defined as, for example, a binary function in which the value switches at the border between the areas with or without the mask. The mask transmittance distribution trimming unit 108 trims, from the calculated mask transmittance distribution, a range defined by the diameter D of the integral kernel K indicating a resist model 223A to be estimated in such a manner that each attention point is located at the center, and sends the trimmed range to the integral kernel estimation unit 104A.

Upon receiving the plurality of mask transmittance distributions trimmed with respect to the plurality of attention points from the mask transmittance distribution trimming unit 108, the integral kernel estimation unit 104A generates a mask transmittance distribution matrix A' based on the plurality of mask transmittance distributions. Upon receiving the development thresholds for the plurality of attention points from the development threshold calculation unit 103, the integral kernel estimation unit 104A generates the resist image vector b based on the plurality of development thresholds. The integral kernel estimation unit 104A estimates an integral kernel vector x' by solving a linear equation A'x'=b, based on the mask transmittance distribution matrix A' and the resist image vector b. The integral kernel estimation unit 104A sends the estimated integral kernel vector x', as a resist model, to the resist model visualization unit 105 and the mask pattern design device 20.

2.2 Operation

Next, an operation of the resist model estimation and display device according to the second embodiment will be described.

2.2.1 Resist Model Estimation and Display Operation

FIG. 23 is a flowchart for explaining a resist model estimation and display operation in the resist model estimation and display device according to the second embodiment. FIG. 23 corresponds to FIG. 11 described in the first embodiment. In FIG. 23, steps ST13A, ST14A, ST16A, and ST17A are performed in place of the steps ST13, ST14, ST16, and ST17 shown in FIG. 11.

Since the steps ST10 to ST12 and ST15 shown in FIG. 23 are substantially the same as those shown in FIG. 11, the descriptions thereof are omitted.

Step ST13A is, for example, performed without performing the step ST12 beforehand, and performed in parallel with the step ST12 after the step ST11. In step ST13A, a control unit 11 functions as the mask transmittance distribution trimming unit 108, and calculates, based on the test mask pattern 123, a mask transmittance distribution for the area including each of the plurality of attention points acquired by sampling in the step ST11.

In step ST14A, the control unit 11 continues to function as the mask transmittance distribution trimming unit 108, and trims the mask transmittance distribution calculated in the step ST13A within the range which has the diameter D of the integral kernel K and has each attention point at the center.

In step ST16A, the control unit 11 functions as the integral kernel estimation unit 104A, and generates the mask transmittance distribution matrix A' and the resist image vector b based on the mask transmittance distributions trimmed within the range having the diameter D of the integral kernel K in the step ST14A and the development thresholds calculated in the step ST15, respectively.

In step ST17A, the control unit 11 continues to function as the integral kernel estimation unit 104A, and estimates the integral kernel vector x' by solving the linear equation A'x'=b based on the mask transmittance distribution matrix A' and the resist image vector b generated in the step ST16A.

Since the step ST18 is substantially the same as that shown in FIG. 11, the description thereof is omitted.

2.2.2 Operation which Generates Mask Transmittance Distribution Matrix

Figure 24:
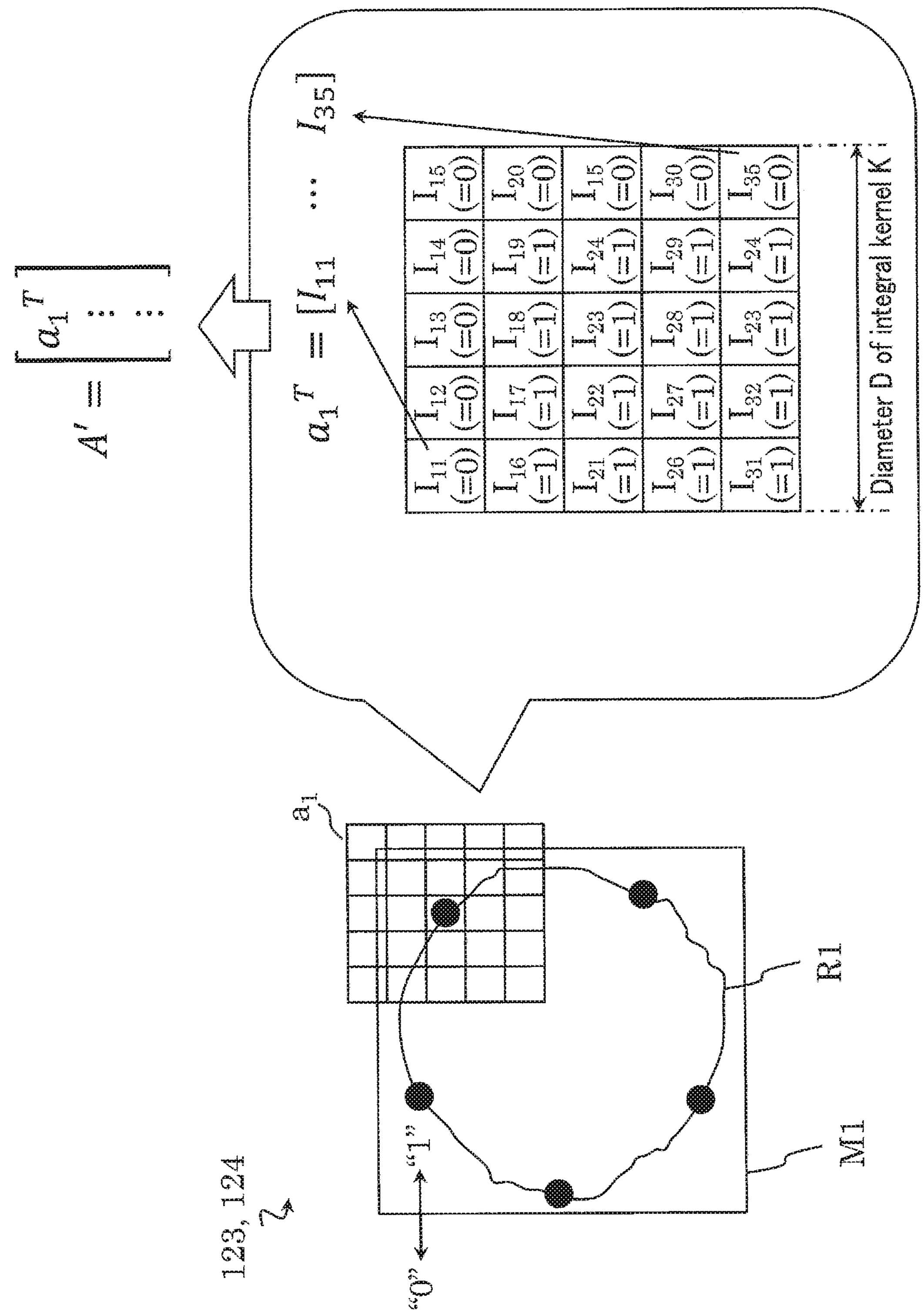
FIG. 24 is a schematic view for explaining an operation which generates a mask transmittance distribution matrix in the resist model estimation and display operation according to the second embodiment.

FIG. 24 is a schematic view for explaining an operation which generates the mask transmittance distribution matrix in the resist model estimation and display operation according to the second embodiment. FIG. 24 corresponds to FIG. 13 in the first embodiment, and corresponds to the steps ST13A, ST14A, and ST16A in FIG. 23. FIG. 24 shows a mask M1 of the test mask pattern 123 and a resist R1 of the test resist pattern 124 explained in FIGS. 3 and 4.

As shown in FIG. 24, the mask transmittance distribution trimming unit 108 sets areas respectively having the attention points acquired by sampling in the step ST11 at the center. In the example of FIG. 24, an area $a_1$ is shown as an example, and the diameter D of the integral kernel K indicating the size of the area $a_1$ is "5". Thus, the number of elements N of the area $a_1$ is "25 (=5^2)".

The mask transmittance distribution trimming unit 108 trims 25 mask transmittances (as a mask transmittance distribution to be sent to the integral kernel estimation unit 104A) respectively corresponding to the areas from the mask transmittance distribution calculated around each attention point. Specifically, the mask transmittance distribution trimming unit 108 extracts 25 mask transmittances ($I_{11}$ to $I_{35}$) (as a mask transmittance distribution to be sent to the integral kernel estimation unit 104A) corresponding to the area $a_1$. The mask transmittance distribution is defined as, for example, a function indicating an area where the light radiated to the resist is masked by the test mask pattern 123 as "0," and indicating an area through which the light passes as "1". Accordingly, the mask transmittances ($I_{11}$ to $I_{35}$) are determined, for example, discretely (namely, as "1" or "0") in accordance with positional relationships with the border of the mask M1.

The integral kernel estimation unit 104A generates a row vector $a_1^T=(I_{11}, I_{12}, \ldots, I_{35})$ based on the 25 mask transmittances $I_{11}$ to $I_{35}$ (the mask transmittance distribution) trimmed with respect to one attention point. The integral kernel estimation unit 104A similarly generates row vectors for the other attention points, and combines those row vectors as one mask transmittance distribution matrix A'.

2.3 Advantageous Effects of Present Embodiment

According to the second embodiment, the integral kernel estimation unit 104 estimates one integral kernel vector x'. With this integral kernel vector x', it is possible to calculate, at a time, an optical model for calculating an optical image intensity distribution from a mask transmittance distribution and a resist model for calculating a resist image distribution from an optical image intensity distribution. As a result, it is possible to acquire a new resist model with which a resist image distribution can be directly calculated from a mask transmittance distribution, and to further suppress a calculation load.

2.4 Modifications

In the second embodiment, a method of estimating an integral kernel vector with which a resist image distribution can be calculated from a mask transmittance distribution based on a mask pattern is described. However, the configuration is not limited thereto. For example, an integral kernel vector with which a resist image distribution can be calculated from a distribution based on a wiring pattern or a lithography pattern which is used for steps earlier than a mask pattern may be estimated.

2.4.1 Hardware Configuration of Resist Model Estimation and Display Device

FIG. 25 is a block diagram for explaining a hardware configuration of a resist model estimation and display device according to a modification of the second embodiment. FIG. 25 corresponds to FIG. 2 described in the first embodiment.

As shown in FIG. 25, a resist model estimation and display device 10B includes a storage unit 12B in place of the storage unit 12 shown in FIG. 2.

The storage unit 12B further stores, for example, a test lithography pattern 125 and a test wiring pattern 126. A wiring pattern indicates an ideal arrangement of wires designed on a semiconductor substrate. A lithography pattern is acquired by estimating a pattern of a resist, which is applied to acquire a desired wiring pattern, based on the desired wiring pattern.

FIG. 26 is a schematic view for explaining the relationships between the multiple types of test patterns stored in the resist model estimation and display device according to the modification of the second embodiment. In FIG. 26, a part of the test wiring pattern 126, a part of the test lithography pattern 125, a part of the test mask pattern 123, and a part of the test resist pattern 124 are associated with each other and shown on the semiconductor substrate (on a rq-plane).

As shown in FIG. 26, the test wiring pattern 126 is stored as, for example, information that shows a border indicating the presence or absence of a wire within a two-dimensional plane. As an example of the test wiring pattern 126, FIG. 26 shows a rectangular wire D1. A side of the wire D1 along the q-direction has, for example, a length S_D.

The test lithography pattern 125 is acquired by estimating a pattern of a resist necessary for acquiring the desired wiring pattern based on the wiring pattern, as described above. Accordingly, the test lithography pattern 125 may be designed to have a size that includes the test wiring pattern 126. As an example of the test lithography pattern 125, FIG. 26 shows a rectangular resist L1. A side of the resist L1 along the q-direction has, for example, a length S_L greater than the length S_D.

The test mask pattern 123 is designed based on the test lithography pattern 125. The test mask pattern 123 is a pattern of a mask which is estimated, based on the lithography pattern, for radiating an optical image intensity distribution necessary for acquiring the desired resist pattern as described above. Accordingly, the test mask pattern 123 may be designed to have a size that includes the test lithography pattern 125. As an example of the test mask pattern 123, FIG. 26 shows a rectangular mask M1. A side of the mask M1 along the q-direction has, for example, a length S_M greater than the length S_L.

The test resist pattern 124 is a pattern of an actual resist acquired by applying the test mask pattern 123 as described above. The test resist pattern 124 is acquired as, for example, a round resist R1 relative to the other rectangular patterns. A length S_R of the diameter of the resist R1 may be almost the same as the length S_L of the resist L1.

Figure 27:
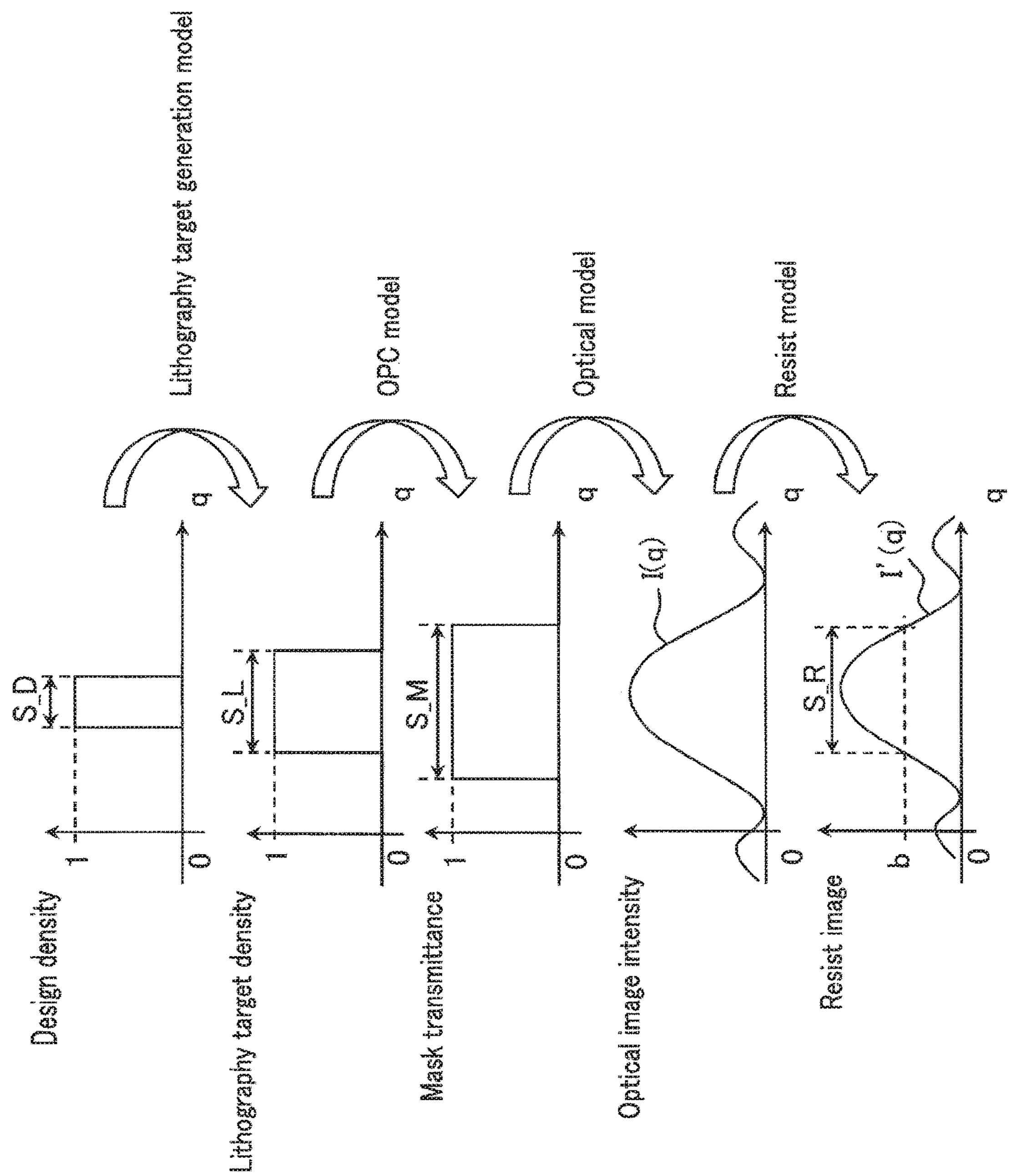
FIG. 27 is a diagram for explaining multiple types of distributions according to the modifications of the second embodiment.

FIG. 27 is a diagram schematically showing distributions corresponding to the respective patterns. FIG. 27 schematically shows the distributions respectively corresponding to the wire D1, the resist L1, the mask M1, and the resist R1 explained in FIG. 26, and the optical image intensity distribution calculated based on the mask M1, along the q-direction. Here, a distribution means a distribution of design-related values determined by using a planar or spatial position as a function. The design-related value includes, for example, an optical image intensity and a resist image. The design-related value further includes, for example, a mask transmittance, a lithography target density, and a design density that are expressed as rectangular functions, with which the borders of the aforementioned mask pattern, lithography pattern, and wiring pattern can be respectively identified. The distribution is not only generated by the above specific design-related values, but may also be generated by other design-related values that may be generated when estimating a resist pattern.

As shown in FIG. 27, a design density distribution corresponding to the wire D1 is expressed as a function of which the value switches on the border of the wiring pattern on the rq-plane. Specifically, in the design density distribution, for example, an area in the wiring pattern where the wire D1 is arranged is defined as "1," and the other area in the wiring pattern is defined as "0". Similarly, a lithography target density distribution corresponding to the resist L1 is expressed as a function of which the value switches on the border of the lithography pattern on the rq-plane. Specifically, in the lithography target density distribution, for example, an area on the lithography pattern where the resist L1 is arranged is defined as "1," and the other area on the lithography pattern is defined as "0". Similarly, a mask transmittance distribution corresponding to the mask M1 is expressed as a function of which the value switches on the border of the mask pattern on the rq-plane. Specifically, in the mask transmittance distribution, for example, an area on the mask pattern where the mask M1 is arranged is defined as "1," and the other area on the mask pattern is defined as "0".

The design density distribution is converted into the lithography target density distribution by, for example, a lithography target generation model. The lithography target density distribution is converted into the mask transmittance distribution by, for example, an OPC model. The mask transmittance distribution is converted into an optical image intensity distribution I(q) by the optical model as described above. The optical image intensity distribution I(q) is converted into a resist image distribution I' (q) by the resist model.

In the first embodiment, the case of estimating the model, which associates the optical image intensity distribution with the resist image distribution, as an integral kernel vector x is described. In the second embodiment, the case of estimating the model, which associates the mask transmittance distribution with the resist image distribution, as an integral kernel vector x' is described. In the modifications below, a case of estimating the model, which associates the lithography target density distribution with the resist image distribution, as an integral kernel vector x", and a case of estimating the model, which associates the design density distribution with the resist image distribution, as an integral kernel vector x"' will be described.

Figure 28:
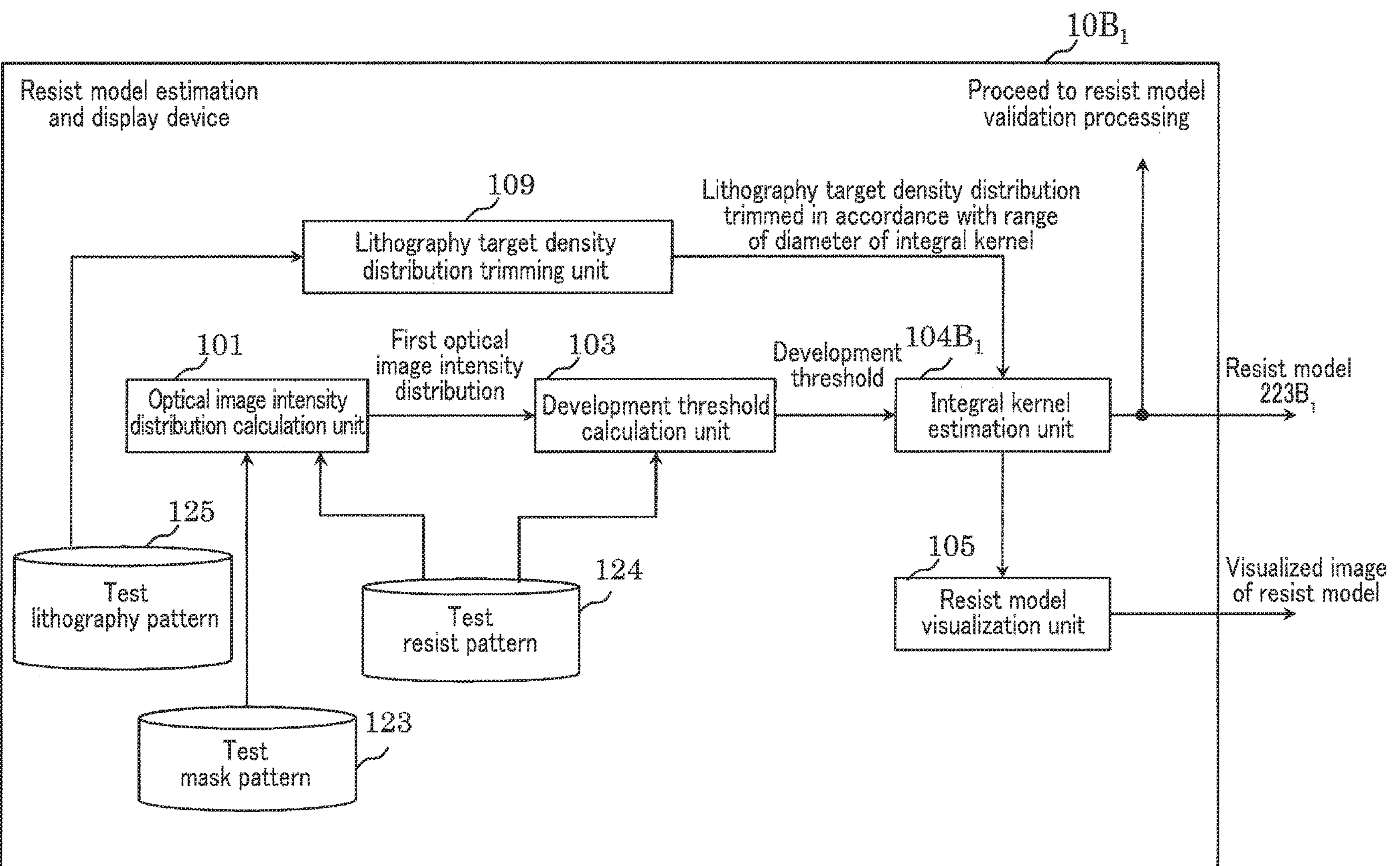
FIG. 28 is a block diagram for explaining a functional configuration of a resist model estimation and display device according to a first modification of the second embodiment.

2.4.2 Case of Estimating Resist Pattern from Lithography Pattern 2.4.2.1 Functional Configuration of Resist Model Estimation and Display Device FIG. 28 is a block diagram for explaining a functional configuration for resist model estimation and display processing among functional configurations of a resist model estimation and display device according to a first modification of the second embodiment. FIG. 28 corresponds to FIG. 22 described in the second embodiment.

A resist model estimation and display device 10$B_1$, when performing the resist model estimation and display processing, functions as a computer including an integral kernel estimation unit 104$B_1$ in place of the integral kernel estimation unit 104A and further including a lithography target density distribution trimming unit 109.

The lithography target density distribution trimming unit 109 reads the test lithography pattern 125 from the storage unit 12B, and calculates a rectangular function (a lithography target density distribution) generated around each attention point according to a shape of the lithography pattern. The lithography target density distribution trimming unit 109 trims, from the calculated lithography target density distribution, a range defined by the diameter D of the integral kernel K indicating a resist model 223$B_1$ to be estimated, in such a manner that each attention point is located at the center, and sends the trimmed range to the integral kernel estimation unit 104$B_1$.

Upon receiving the plurality of lithography target density distributions trimmed with respect to the plurality of attention points from the lithography target density distribution trimming unit 109, the integral kernel estimation unit 104$B_1$ generates a lithography target density distribution matrix A" based on the plurality of lithography target density distributions. Upon receiving the development thresholds for the plurality of attention points from the development threshold calculation unit 103, the integral kernel estimation unit 104$B_1$ generates the resist image vector b based on the plurality of development thresholds. The integral kernel estimation unit 104$B_1$ estimates an integral kernel vector x" by solving a linear equation A"x"=b based on the lithography target density distribution matrix A" and the resist image vector b. The integral kernel estimation unit 104$B_1$ sends the estimated integral kernel vector x", as a resist model, to the resist model visualization unit 105 and the mask pattern design device 20.

2.4.2.2 Resist Model Estimation and Display Operation

Figure 29:
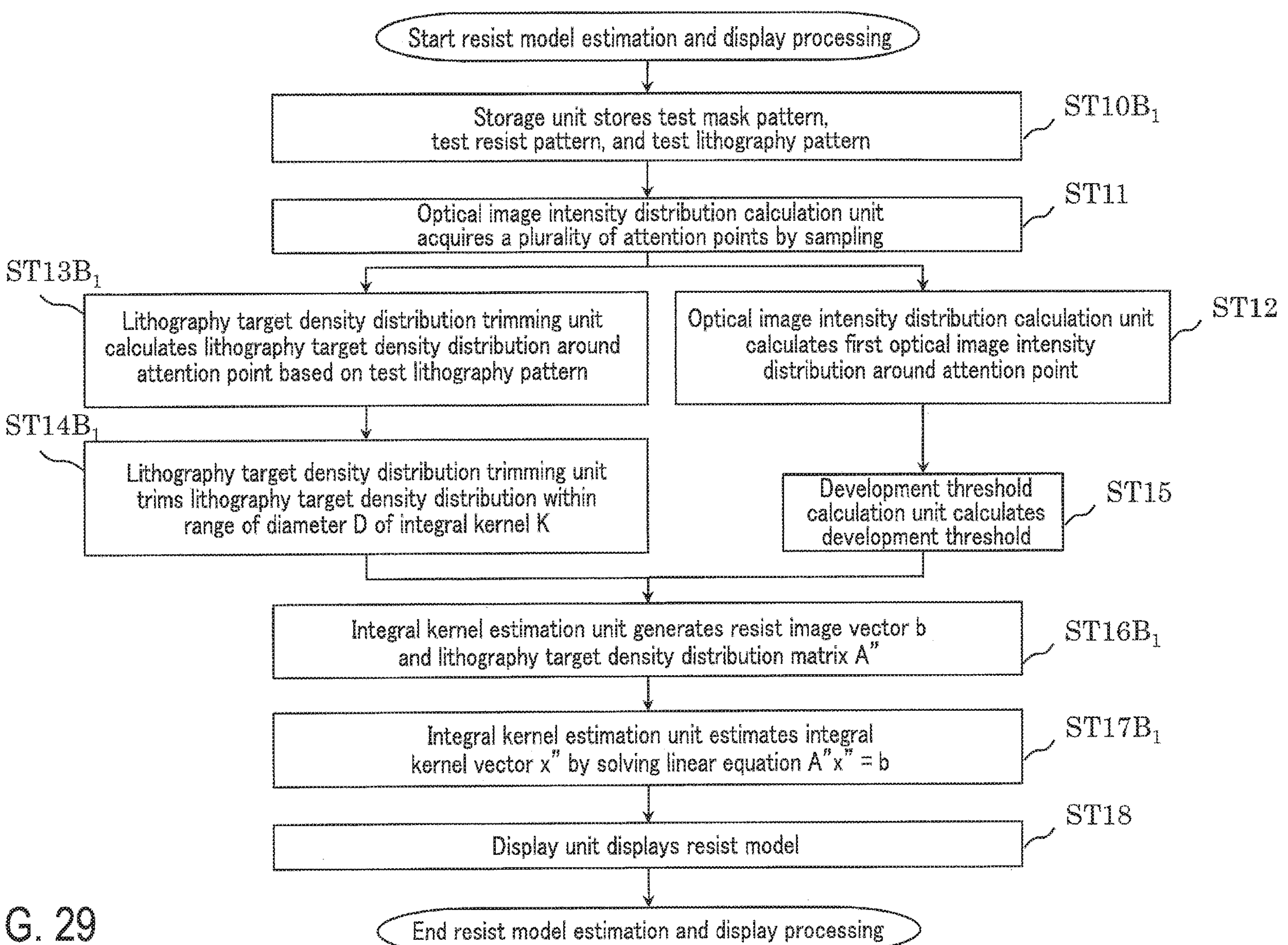
FIG. 29 is a flowchart for explaining a resist model estimation and display operation in the resist model estimation and display device according to the first modification of the second embodiment.

FIG. 29 is a flowchart for explaining a resist model estimation and display operation in the resist model estimation and display device according to the first modification of the second embodiment. FIG. 29 corresponds to FIG. 23 described in the second embodiment. In FIG. 29, steps ST10$B_1$, ST13$B_1$, ST14$B_1$, ST16$B_1$, and ST17$B_1$ are performed in place of the steps ST10, ST13A, ST14A, ST16A, and ST17A shown in FIG. 23.

As shown in FIG. 29, in step ST10$B_1$, the storage unit 12B stores the test mask pattern 123, the test resist pattern 124, and the test lithography pattern 125 externally input via the communication unit 15.

Since the steps ST11, ST12, and ST15 are substantially the same as those shown in FIG. 23, descriptions thereof are omitted.

In step ST13$B_1$, the control unit 11 functions as the lithography target density distribution trimming unit 109, and calculates, with respect to the area including each of the plurality of attention points acquired by sampling in the step ST11, a lithography target density distribution around each attention point based on the test lithography pattern 125.

In step ST14$B_1$, the control unit 11 continues to function as the lithography target density distribution trimming unit 109, and trims the lithography target density distribution calculated in the step ST13$B_1$ within the range which has the diameter D of the integral kernel K and has each attention point at the center.

In step ST16$B_1$, the control unit 11 functions as the integral kernel estimation unit 104$B_1$, and generates the lithography target density distribution matrix A" and the resist image vector b based on the lithography target density distribution trimmed within the range which has the diameter D of the integral kernel K in the step ST14$B_1$ and the development thresholds calculated in the step ST15, respectively.

In step ST17$B_1$, the control unit 11 continues to function as the integral kernel estimation unit 104$B_1$, and estimates the integral kernel vector x" by solving the linear equation A"x"=b based on the lithography target density distribution matrix A" and the resist image vector b generated in the step ST16$B_1$.

Since the step ST18 is substantially the same as that shown in FIG. 23, description thereof is omitted.

By performing the operations described above, it is possible to acquire a new resist model with which a resist image distribution can be directly calculated from a lithography target density distribution, and to further suppress a calculation load.

Figure 30:
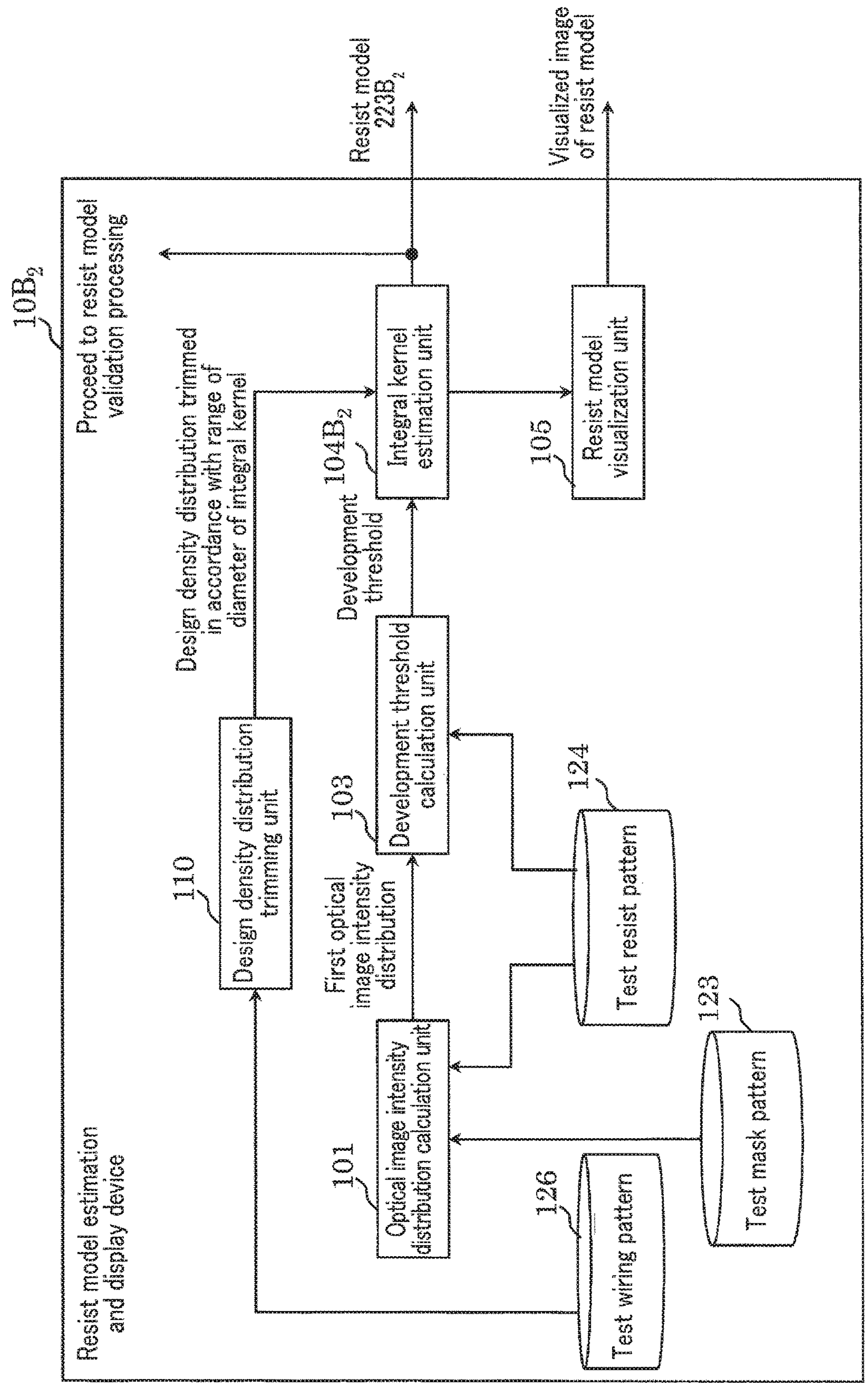
FIG. 30 is a block diagram for explaining a functional configuration of a resist model estimation and display device according to a second modification of the second embodiment.

2.4.3 Case of Estimating Resist Pattern from Wiring Pattern 2.4.3.1 Functional Configuration of Resist Model Estimation and Display Device FIG. 30 is a block diagram for explaining a functional configuration for a resist model estimation and display processing among functional configurations of a resist model estimation and display device according to a second modification of the second embodiment. FIG. 30 corresponds to FIG. 22 described in the second embodiment.

A resist model estimation and display device 10$B_2$, when performing the resist model estimation and display processing, functions as a computer including an integral kernel estimation unit 104$B_2$ in place of the integral kernel estimation unit 104A and further including a design density distribution trimming unit 110.

The design density distribution trimming unit 110 reads the test wiring pattern 126 from the storage unit 12B, and calculates a rectangular function (a design density distribution) generated around each attention point according to a shape of the wiring pattern. The design density distribution trimming unit 110 trims, from the calculated design density distribution, a range defined by the diameter D of the integral kernel K indicating a resist model 223$B_2$ to be estimated, in such a manner that each attention point is located at the center, and sends the trimmed range to the integral kernel estimation unit 104$B_2$.

Upon receiving the plurality of design density distributions trimmed with respect to the plurality of attention points from the design density distribution trimming unit 110, the integral kernel estimation unit 104$B_2$ generates a design density distribution matrix A''' based on the plurality of design density distributions. Upon receiving the development thresholds for the plurality of attention points from the development threshold calculation unit 103, the integral kernel estimation unit 104$B_2$ generates the resist image vector b based on the plurality of development thresholds. The integral kernel estimation unit 104$B_2$ estimates an integral kernel vector x''' by solving a linear equation A'''x'''=b based on the design density distribution matrix A''' and the resist image vector b. The integral kernel estimation unit 104$B_2$ sends the estimated integral kernel vector x''', as a resist model, to the resist model visualization unit 105 and the mask pattern design device 20.

2.4.3.2 Resist Model Estimation and Display Operation

Figure 31:
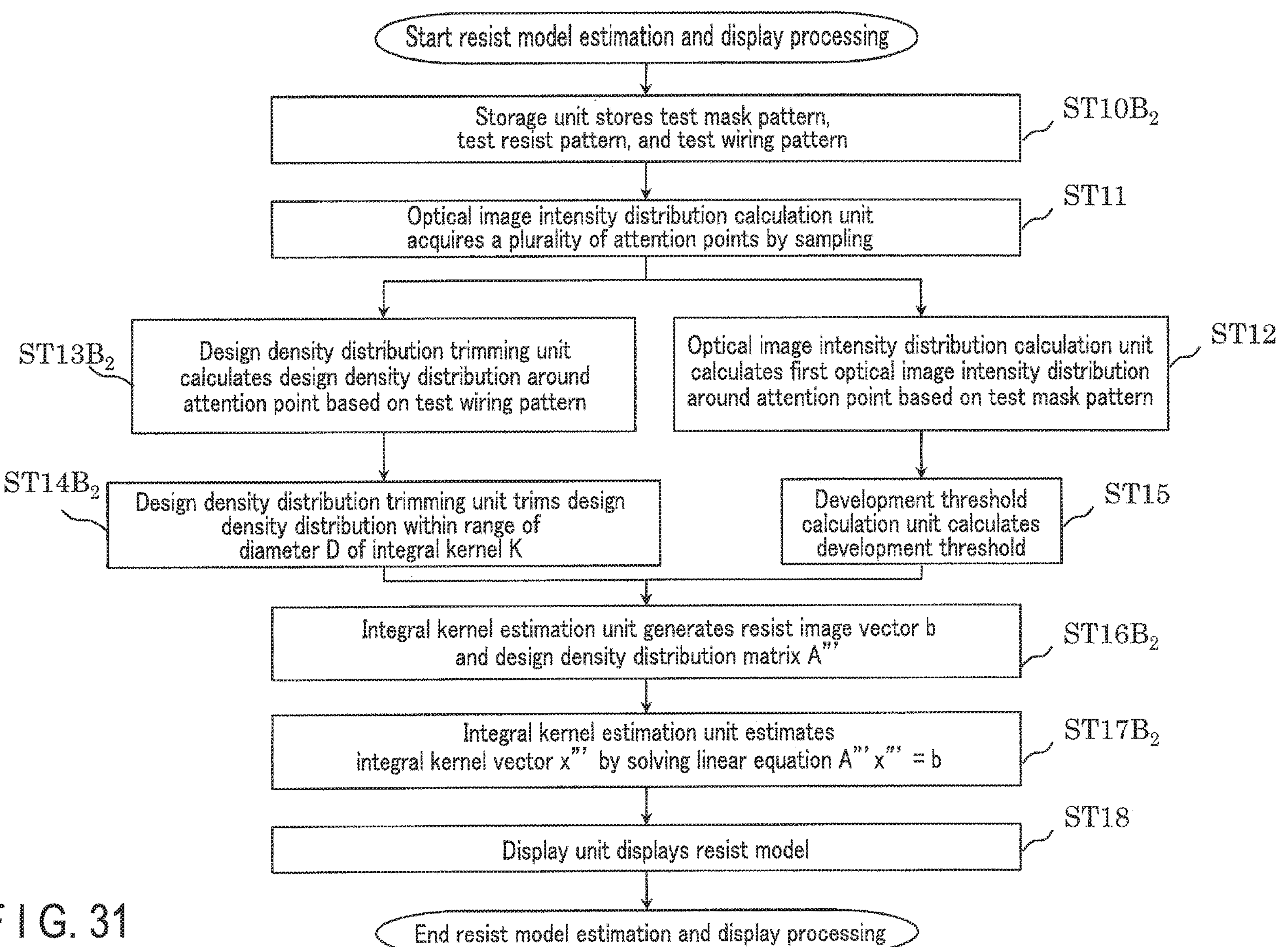
FIG. 31 is a flowchart for explaining a resist model estimation and display operation in the resist model estimation and display device according to the second modification of the second embodiment.

FIG. 31 is a flowchart for explaining the resist model estimation and display operation in the resist model estimation and display device according to the second modification of the second embodiment. FIG. 31 corresponds to FIG. 23 described in the second embodiment. In FIG. 31, steps ST10$B_2$, ST13$B_2$, ST14$B_2$, ST16$B_2$, and ST17$B_2$ are performed in place of the steps ST10, ST13A, ST14A, ST16A, and ST17A shown in FIG. 23.

As shown in FIG. 31, in step ST10$B_2$, the storage unit 12B stores the test mask pattern 123, the test resist pattern 124, and the test wiring pattern 126 externally input via the communication unit 15.

Since the steps ST11, ST12, and ST15 are substantially the same as those shown in FIG. 23, descriptions thereof are omitted.

In step ST13$B_2$, the control unit 11 functions as the design density distribution trimming unit 110, and calculates, with respect to the area including each of the plurality of attention points acquired by sampling in the step ST11, a design density distribution around each attention point based on the test wiring pattern 126.

In step ST14$B_2$, the control unit 11 continues to function as the design density distribution trimming unit 110, and trims the design density distribution calculated in the step ST13$B_2$ within the range which has the diameter D of the integral kernel K and has each attention point at the center.

In step ST16$B_2$, the control unit 11 functions as the integral kernel estimation unit 104$B_2$, and generates the design density distribution matrix A''' and the resist image vector b based on the design density distribution trimmed within the range which has the diameter D of the integral kernel K in the step ST14$B_2$ and the development thresholds calculated in the step ST15, respectively.

In step ST17$B_2$, the control unit 11 continues to function as the integral kernel estimation unit 104$B_2$, and estimates the integral kernel vector x''' by solving the linear equation A''' x'''=b based on the design density distribution matrix A''' and the resist image vector b generated in the step ST16$B_2$.

Since the step ST18 is substantially the same as that shown in FIG. 23, description thereof is omitted.

By performing the operations described above, it is possible to acquire a new resist model with which a resist image distribution can be directly calculated from a design density distribution, and to further suppress a calculation load.

3. Others

The aforementioned first embodiment and second embodiment may have various modifications.

In the first embodiment and the second embodiment, the resist model estimation and display methods for estimating a model that converts multiple types of patterns into a resist pattern as a resist model, and displaying the estimation result to the user are described. However, the configuration is not limited thereto. For example, the resist model estimation and display methods described in the first embodiment and the second embodiment may be similarly applied to a case of estimating, as one integral kernel at a time, a model which considers a process model of a hard mask pattern formed for a hard mask after forming a resist pattern in addition to a resist model. In this case, attention points are not acquired by sampling the border of a resist pattern, but are acquired by sampling the border of a hard mask pattern (not shown) which is formed after processing a hard mask along the resist pattern. Furthermore, thresholds calculated based on the optical image intensities on the attention points are not development thresholds, but may be values of the optical image intensities which are required to be ideally the same at the positions forming the border of the hard mask pattern.

For example, in the first embodiment, the example where a resist model which can convert an optical image intensity distribution into a resist image distribution is estimated, and the resist model is applied to the designing of a mask pattern that is an upper process, is described; moreover, similar application can be adopted in the second embodiment. Specifically, for example, in the second embodiment, a design system may be configured to estimate a resist model that can convert a mask transmittance distribution into a resist image distribution, and then apply the resist model to the designing of a lithography pattern that is an upper process. Similarly, in the first modification of the second embodiment, a design system may be configured to estimate a resist model that can convert a lithography target density distribution into a resist image distribution, and then apply the resist model to the designing of a wiring pattern that is an upper process.

Furthermore, for example, in the first embodiment, the mask pattern design system 1 as being constituted by two devices, that is, the resist model estimation and display device 10 and the mask pattern design device 20, is described. However, the configuration is not limited thereto. For example, the resist model estimation and display device 10 and the mask pattern design device 20 may be configured in one device. The control units 11 and 21 may include a dedicated circuit (a dedicated processor) constituted by, for example, one or more GPUs, ASICs, and FPGAs. The control units 11 and 21 may implement, by the dedicated processor, the functions by the optical image intensity distribution calculation units 101 and 201, the optical image intensity distribution trimming unit 102, the development threshold calculation unit 103, the integral kernel estimation unit 104, the resist model visualization unit 105, the resist contour information generation units 106 and 202, the validation unit 107, the evaluation unit 203, and the mask pattern generation unit 204 of the mask pattern design system 1.

In the first embodiment and the second embodiment, methods of estimating a resist model from the distribution of the design-related values in which a design-related value is one of the optical image intensity distribution, the mask transmittance, the lithography target density, or the design density are described. However, the configuration is not limited thereto. For example, a resist model may be estimated not only from the above design-related values but also from other given design-related values which may be generated when estimating a resist pattern by using a similar method to the above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the invention.

What is claimed is:

1. A method of displaying a model, the method comprising:

sampling a pattern of a resist to acquire M attention points, where M is an integer equal to or greater than 1;

calculating, for each of the M attention points, an optical image intensity distribution indicating an optical image intensity at each of N points including the attention point and N−1 points in a vicinity of the attention point, where N is an integer equal to or greater than 1;

calculating a development threshold for the pattern based on the optical image intensity distribution calculated for each of the M attention points;

estimating a second vector x as a resist model by solving a minimization problem of a cost function F=||b−Ax||2 based on a matrix A and a first vector b; and displaying the resist model, wherein:

the matrix A is an optical image intensity distribution matrix of M rows and N columns based on the optical image intensity distribution calculated for each of the M attention points, the first vector b is a resist image vector having M elements and based on the calculated development threshold, the second vector x is an integral kernel vector having N elements and configured to convert the optical image intensity distribution into the resist image vector, and the resist model is a chemical reaction model of the resist subjected to optical imaging with the optical image intensity.

2. The method of claim 1, wherein the attention points are acquired by sampling a border of the pattern.

3. The method of claim 2, wherein:

the pattern comprises a resist pattern corresponding to a mask pattern, the attention points are acquired by sampling the resist pattern, and the optical image intensity distribution is calculated based on the mask pattern.

4. The method of claim 1, wherein the displaying includes visualizing the model by mapping the N elements on a certain area.

5. A method of designing a pattern, the method comprising:

sampling a first pattern of a resist to acquire M attention points, where M is an integer equal to or greater than 1;

calculating, for each of the M attention points, an optical image intensity distribution indicating an optical image intensity at each of N points including the attention point and N−1 points in a vicinity of the attention point, where N is an integer equal to or greater than 1;

calculating a development threshold for the first pattern based on the optical image intensity distribution calculated for each of the M attention points;

estimating a second vector x as a resist model by solving a minimization problem of a cost function F=||b−Ax||2 based on a matrix A and a first vector b;

displaying the resist model; and designing a second pattern including a design parameter of the first pattern by applying the resist model, wherein:

the matrix A is an optical image intensity distribution matrix of M rows and N columns based on the optical image intensity distribution calculated for each of the M attention points, the first vector b is a resist image vector having M elements and based on the calculated development threshold, the second vector x is an integral kernel vector having N elements and configured to convert the optical image intensity distribution into the resist image vector, and the resist model is a chemical reaction model of the resist subjected to optical imaging with the optical image intensity.

6. A non-transitory computer-readable storage medium storing a program which causes a computer to:

sample a pattern of a resist to acquire M attention points, where M is an integer equal to or greater than 1;

calculate, for each of the M attention points, an optical image intensity distribution indicating an optical image intensity at each of N points including the attention point and N−1 points in a vicinity of the attention point, where N is an integer equal to or greater than 1;

calculate a development threshold for the pattern based on the optical image intensity distribution calculated for each of the M attention points;

estimate a second vector x as a resist model by solving a minimization problem of a cost function F=||b−Ax||2 based on a matrix A and a first vector b; and display the resist model, wherein:

the matrix A is an optical image intensity distribution matrix of M rows and N columns based on the optical image intensity distribution calculated for each of the M attention points, the first vector b is a resist image vector having M elements and based on the calculated development threshold, the second vector x is an integral kernel vector having N elements and configured to convert the optical image intensity distribution into the resist image vector, and the resist model is a chemical reaction model of the resist subjected to optical imaging with the optical image intensity.

* * * * *